(12) United States Patent
Kreutzman

(10) Patent No.: US 9,002,185 B2
(45) Date of Patent: Apr. 7, 2015

(54) PV WATER HEATING SYSTEM

(76) Inventor: David Kreutzman, Louisville, CO (US)

(\*) Notice: Subject to any disclaimer, the term of this patent is extended or adjusted under 35 U.S.C. 154(b) by 302 days.

(21) Appl. No.: 13/442,701

(22) Filed: Apr. 9, 2012

(65) Prior Publication Data

US 2013/0263843 A1  Oct. 10, 2013

(51) Int. Cl.
| | |
|---|---|
| A47J 27/00 | (2006.01) |
| F24D 11/00 | (2006.01) |
| F24D 17/00 | (2006.01) |
| F24D 19/10 | (2006.01) |
| F24H 9/18 | (2006.01) |

(52) U.S. Cl.
CPC .............. *F24D 11/004* (2013.01); *Y02B 10/40* (2013.01); *Y02B 10/20* (2013.01); *Y02B 10/70* (2013.01); *F24H 9/1818* (2013.01); *F24D 17/0031* (2013.01); *F24D 17/0036* (2013.01); *F24D 19/1006* (2013.01); *F24D 2200/02* (2013.01); *F24D 2200/15* (2013.01); *F24D 2200/32* (2013.01)

(58) Field of Classification Search
None
See application file for complete search history.

(56) References Cited

U.S. PATENT DOCUMENTS

| | | | | |
|---|---|---|---|---|
| 1,526,204 | A * | 2/1925 | Campbell | 392/451 |
| 2,459,123 | A * | 1/1949 | Bates et al. | 204/196.15 |
| 4,200,783 | A * | 4/1980 | Ehret | 392/341 |
| 4,257,397 | A | 3/1981 | Gouyou-Beauchamps | |
| 4,367,726 | A | 1/1983 | Maes, Jr. | |
| 5,168,546 | A * | 12/1992 | Laperriere et al. | 392/454 |
| 5,293,447 | A * | 3/1994 | Fanney et al. | 392/449 |
| 6,463,212 | B1 | 10/2002 | Salyer | |
| 6,837,303 | B2 * | 1/2005 | Butler | 165/74 |
| 7,793,652 | B1 | 9/2010 | Delgado | |
| 7,827,814 | B2 | 11/2010 | Slater | |
| 7,913,684 | B2 * | 3/2011 | Butler | 126/589 |
| 8,356,481 | B2 | 1/2013 | Penev | |
| 8,375,934 | B2 | 2/2013 | Zheng | |
| 8,485,178 | B2 | 7/2013 | Diaz et al. | |
| 8,511,296 | B2 | 8/2013 | Sweet | |
| 8,536,495 | B2 | 9/2013 | Lako | |
| 2008/0107409 | A1 * | 5/2008 | Lesage et al. | 392/454 |
| 2008/0205865 | A1 | 8/2008 | Lesage et al. | |
| 2009/0038609 | A1 | 2/2009 | Mastov et al. | |
| 2009/0188486 | A1 | 7/2009 | Thomasson | |
| 2009/0211567 | A1 | 8/2009 | Thomasson | |
| 2009/0214195 | A1 * | 8/2009 | Thomasson | 392/451 |
| 2010/0031953 | A1 | 2/2010 | Penev et al. | |
| 2010/0319681 | A1 | 12/2010 | Li | |
| 2011/0017201 | A1 | 1/2011 | Yang | |
| 2011/0017273 | A1 | 1/2011 | Roach et al. | |
| 2011/0139144 | A1 | 6/2011 | Zheng | |
| 2011/0146665 | A1 | 6/2011 | Scharfe | |
| 2011/0277744 | A1 | 11/2011 | Gordon et al. | |
| 2011/0305444 | A1 | 12/2011 | Pussell | |
| 2012/0017886 | A1 | 1/2012 | Gordon et al. | |
| 2012/0024372 | A1 | 2/2012 | Delgado | |
| 2012/0060827 | A1 | 3/2012 | Roetker | |
| 2012/0060829 | A1 * | 3/2012 | DuPlessis et al. | 126/609 |
| 2012/0078433 | A1 | 3/2012 | Honma et al. | |
| 2012/0210999 | A1 | 8/2012 | Straeter | |
| 2012/0279493 | A1 | 11/2012 | Dotan | |
| 2014/0010522 | A1 * | 1/2014 | van der Heijden et al. | 392/451 |
| 2014/0112647 | A1 * | 4/2014 | Lichtenberger | 392/308 |
| 2014/0153913 | A1 * | 6/2014 | Newman et al. | 392/451 |

\* cited by examiner

*Primary Examiner* — Thor Campbell
(74) *Attorney, Agent, or Firm* — Russell T. Manning; Marsh Fischmann & Breyfogle LLP

(57) ABSTRACT

Provided herein are systems and methods directed to using renewable energy sources with hot water heating systems.

17 Claims, 15 Drawing Sheets

PV WATER HEATING SYSTEM

FIELD

Systems and methods (i.e., utilities) disclosed herein are directed to improvements to renewable energy hot water heating for residential and commercial applications.

BACKGROUND

In household and commercial usage, most hot water heaters in North America, as well as numerous other countries, are of a storage type. Such storage type water heaters typically include a cylindrical vessel/container (i.e., tank) in which water is kept continuously hot and ready for use. Typical sizes for household use range from about 20 to 120 U.S. gallons. Water heaters for commercial applications are often much larger. Heating the water in the tank may is typically affected by way of electrical heating elements or fossil fuel burners (e.g., natural gas, propane, fuel oil, bio mass, etc.) burners. Often, the source of the energy for heating is a local utility.

In most hot water heaters, water is introduced into the storage tank via a water supply inlet pipe. Water typically enters residences in the US at about 50° F. though this varies with latitude of the residence and the season. An electrical element within the tank or a burner disposed beneath the tank is selectively operated to heat the water within the tank to a preset temperature. For instance, hot water temperatures of 105-120° F. are typically preferred for residential applications. Operation of the element or burner is controlled by a thermostat that monitors/measures the temperature within the tank. When the water within the tank is below a desired temperature, the electrical element is energized or the burner is ignited to heat the tank and the water therein.

Energy efficiencies of water heaters in residential use can vary greatly based on manufacturer, model and/or age. Gas fired water heaters typically have efficiencies of between about 55% and 95%. Electric water heaters have high efficiencies (e.g., above 95%) once the electricity enters the home but are more costly to operate due to electricity generation and transmission costs. In either case, a typical household expends roughly 30% of its total energy use heating water.

SUMMARY

Provided herein are various systems and methods (i.e., utilities) broadly directed to the generation of hot water using energy derived from renewable energy sources. In the various aspects, these utilities are directed to the retrofitting of existing water heaters with electrical heating elements that are connectable to a renewable source of electrical energy. While primarily discussed in relation to retrofitting existing water heaters, various aspects are applicable to OEM manufactured systems. Further, various control methods are provided that allow for enhancing the efficiency of hot water generation, net metering, and/or the generation of renewable energy credits.

In one aspect, a supplemental heating element is provided for use with a hot water heating system. In this aspect, the hot water heating system includes, a storage tank having an inlet that is fluidly connectable to a pressurized or gravity fed water supply and an outlet that is fluidly connectable to at least at least one valve or tap. When the valve or tap is opened, water from the water supply displaces water through the storage tank and out of the outlet. The storage tank is heated by a first heating element that is connectable to a first power source that provides power from one of fossil fuel (e.g., gas, bio mass, etc), AC electricity and/or existing solar or solar/thermal systems that are underperforming. Such power sources include utility sources and storage tanks (e.g., propane). A thermostat connected to the first heating element controls operation of the first heating element based at least in part on a temperature of water in the storage tank. The system further includes a second or supplemental heating element. The supplemental heating element includes a threaded collar for threaded insertion with a threaded opening of the storage tank. A supplemental electrical element is connected to an inside surface of the threaded collar such that when the threaded is threaded into the threaded opening, the supplemental electrical element is disposed within the storage tank. An electrical connector extends though the threaded collar to electrically connect the supplemental electrical element with a coupling or plug that is disposed on an outside surface of the storage tank when the threaded collar is in threaded engagement with the storage tank. Finally, the system includes a renewable power source electrically connected to the supplemental heating element. The renewable power source is typically an on-site source that provides electrical power to the supplemental heating element. On-site renewable generation depends on the renewable energy resources available at that site, e.g., solar, wind, hydro, geothermal, biomass, etc., and are not mutually exclusive. Any renewable power source that provides electrical energy may be utilized. Typically, the on-site renewable energy source provides a DC voltage, which may be inverted to an AC voltage prior to application to the supplemental heating element. However, in some arrangements, the renewable energy source may include direct AC generation (e.g., wind turbines).

To control the operation of the supplemental heater, the system may further include a temperature sensor that monitors the water temperature within the tank. In its simplest form, the controller is formed of a switch disposed between the renewable power source and the supplemental heating element. This switch opens upon the temperature sensor identifying a predetermined temperature within the tank. This predetermined temperature may be preset or selected by a user.

In various arrangements, the threaded collar is sized for threaded engagement with an inlet or outlet of the storage tank, a drain opening of the tank, or a pressure relief valve of the tank. In these arrangements, the threaded collar may further include a tubular body with a hollow interior to permit fluid flow though the collar. In this arrangement, the electrical connectors pass through a sidewall portion of the tubular body. It may be preferential that electrical conductors and other elements passing through a portion of a hollow interior of the tubular body have a combined cross-sectional area that is less than 40% of the cross-sectional area of the hollow interior of the tubular body to reduce flow impedance. In a further arrangement, the combined cross-sectional area is less than 20% of the cross-sectional area of the hollow interior.

In one arrangement, the threaded collar includes first and second heating elements that may be connected to first and second power sources. For instance, the first heating element may be connected to a renewable power source and the second heating element may be connected to a utility power source (e.g., an AC source).

The controller, as noted above, may be included to control the operation of the system. In this regard, the controller may be connected to and control operation of the first heating element and the supplemental heating element. In this regard, the controller selectively operates the heating elements. To affect such control, the controller may further include operating logic adapted to identify expected usage times when water passes through the tank between the inlet and the outlet. Accordingly, the controller may control the heating elements based at least in part on the usage times. For instance, the controller may operate the supplemental heating element when a temperature of the tank is below a predetermined threshold level if power is being received from the renewable power source. That is, the controller may deactivate the first heating element and rely on the supplemental heating element. Further, the controller may deactivate the first heating element if a next expected usage time is more than a predetermined time away. Such predetermined time may be determined from usage patterns or via user inputs. In various arrangements, the first heating element is an electrical element that is connected to an AC utility provider. In another arrangement, the first heating element is a gas burner. The controller may further include a network interface to allow sending or receiving information or instructions to an outside platform. In such an arrangement, a third party (e.g., utility, device manufacturer, device installer, etc) may control one or more operations of the system. For instance, a utility or other third party may remotely command the controller to deactivate the first heating element. Further the controller may identify and/or report an amount of power received from the renewable power source. For instance, the controller may be in data communication with a third party and the controller may report power received from the renewable power source to the third party who may use this information to generate RECs. In further arrangement, the controller may include a maximum power point tracking (MPPT) module for controlling power output of the photovoltaic array. Likewise, the controller may alter the configuration of a PV array (e.g., series, parallel) to enhance power output.

In a further arrangement, the system may include a phase change material (PCM) container in thermal contact with the storage tank. Such a PCM may be a solid to liquid PCM. In this arrangement the PCM may allow for storing additional thermal energy when available from the renewable energy source. The PCM container may also include a supplemental heating element.

In another aspect, a system is provided for heating water in-line in a water flow path. The system includes tubular body having a hollow interior extending between first and second open ends. The first and second open ends are adapted for connection with first and second pipes, respectively in a water flow path. Electrical leads extend through a sidewall of the tubular body between the first and second open ends via a fluid tight coupling in the sidewall. An electrical heating element disposed within the hollow interior of the tubular body between the first and second ends is connected to the electrical leads. A renewable power source is connected to the electrical heating element via the electrical lead and provides electrical power to the electrical heating element.

Another aspect is directed to retrofitting a hot water heater with a supplemental electrical heating element. The utility includes removing a first threaded connector from a threaded inlet opening of the hot water tank and disposing an electrical heating element through the opening. Once positioned within the tank a second threaded connector, attached to the electrical heating element, is threaded into the threaded inlet opening and forms a fluid tight seal with the inlet opening. At this time, electrical leads from a renewable energy source may be connected to an electrical connector associated with the second threaded connector.

In one arrangement, the supplemental heating element may include first and second heating elements that may be connected to first and second power sources. For instance, the first heating element may be connected to a renewable power source and the second heating element may be connected to a utility power source (e.g., an AC source).

In the present utility, wherein removing a first threaded connector may include removing an existing heating element, removing an inlet pipe, removing an outlet pipe, removing an anode rod, removing a drain valve, and removing a pressure relief valve.

The utility may further comprise connecting a controller between the electrical heating element and the renewable energy source, where the controller is operative to connect and disconnect the renewable power source and the electrical heating element. the controller may also be connected to a utility that is connected to a standard heating element of the water heater. In this arrangement, the controller is operative to selectively operate the electrical heating element and the utility connected heating element. That is, the controller may selectively deactivate the utility connected heater element. Such deactivation may occur when electrical energy from the renewable energy source is above a predetermined level or according to a predetermined schedule, which may be user specified or generated based on historic usage patterns.

According to another aspect, a utility is provided for preheating water for use with an instantaneous water heat system. The utility includes a storage tank connected to a water inlet and having a water outlet. The storage tank further includes an electrical heating element disposed on or within the storage tank and a renewable power source electrically connected to the electrical heating element. The renewable power source provides electrical power to the electrical heating element. Finally, the system includes a tankless water heater (e.g., gas or electric) having an inlet fluidly connected to the water outlet of the storage tank.

In a further aspect, a utility is provided for use with a hot water heater having a first heating element connected to a utility power source and a second heating element connected to a renewable energy source. The utility includes providing a controller connected to the first heating element and the second heating element where the controller is operative to execute logic to determine an amount of energy generated by the renewable heating element. The controller is then operative to report the amount of energy generated to a third party via an input/output interface. The third party may then bundle the amount of energy produced with amounts form other hot water heaters connected to renewable energy sources to generate RECs.

In another aspect, a utility is provided for use with a hot water heater having a first heating element connected to a utility power source and a second heating element connected to a renewable energy source, The utility includes providing a controller interconnected to the first heating element and the second heating element, where the controller is operative to execute logic to selectively operate the first and second element. The controller operates the second heating element when a temperature of water in a tank of the hot water heater is below a predetermined threshold level. The controller also deactivates the first heating element when the electrical energy from the renewable energy source is above a predetermined level or when a command is received to deactivate the first heating element from an input interface.

Such commands may be received from a user interface or from a utility provider via a data interface. Likewise, the controller may be operative to divert electrical energy from the second heating element into an electrical grid upon one of, for example, the water reaching a predetermined threshold temperature or receiving a diversion command from a utility provider via the data interface.

According to another aspect, a hybrid hot water heater is provided that utilizes both a gas burner and an electrical heating element. The hybrid hot water heater includes a storage tank having an inlet and outlet. A gas-fired heating element that is adapted to burn gas (e.g., natural gas or propane) from a gas supply is operative to apply thermal energy to water in the storage tank. The hybrid hot water heater also includes an electrical heating element that is at least partially disposed within the storage tank and which is adapted for connection to an electrical power source. In one embodiment, a controller is connected to both heating elements and is operative to selectively operate these elements.

The electrical heating element may be interconnected to any electrical power source including utility generated sources and renewable energy sources. In one embodiment, electrical power source is a DC power source provided from a renewable energy source. In this embodiment the DC power may be inverted to AC power prior to application to the heating element.

The heating elements may each be interconnected to a thermostat such that each heating element is independently controlled based on its respective thermostat. In this regard, the controller may receive information from the thermostats for use in controlling the operation of the heating elements. Alternatively, the controller may receive temperature information from a single thermostat and utilize this information control both elements. In one arrangement, the electrical heating element is set to a higher temperature than the gas-fired heating element such that the electrical heating element operates prior to the operation of the gas-fired heating element. Such an arrangement may be desirable when the electrical power source is a renewable source.

According to another aspect, a dual element heating element assembly is provided for use with the hot water heater. This heating element assembly is adapted for insertion in a single orifice within the hot water heater. Interconnected to the inside surface of the heating element assembly are first and second separate heating elements that may be connected to first and second separate electrical power sources. Such separate power sources may include first and second renewable energy sources or a utility electrical power source and a renewable energy source. It will be appreciated that such a dual element heating element assembly may be utilized to retrofit existing electric hot water heaters to allow use with renewable energy sources. However, OEM hot water heaters may incorporate such dual element assemblies as well.

According to a further aspect, a method is provided for interconnecting a single electrical heating element of a hot water heater to first and second electrical power sources. Typically, these first and second electrical power sources include a utility provided electrical power source (e.g., a fossil fuel AC power source) and a renewable energy power source. The method includes operating a controller that selectively operates a first and second power sources. In this regard, if sufficient electrical power is available from the renewable energy power source, the utility provided electrical power source may be disconnected to preferentially utilize renewable energy. Alternatively, energy from both sources may be simultaneously applied to the single electrical heating element. In such an arrangement, the controller may further include an inverter (integrated therein, mounted on the panels, or otherwise disposed between the renewable energy source and the heating element) that matches the phase of the renewable power with the phase of the utility provided power. In an arrangement including inverter, power may be fed from the renewable energy source back into the utility grid. Such power may be directed through the heating element.

It will be appreciated that elements of the various aspects may be incorporated into one another without limitation and as further discussed herein.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions.

Figure 1:
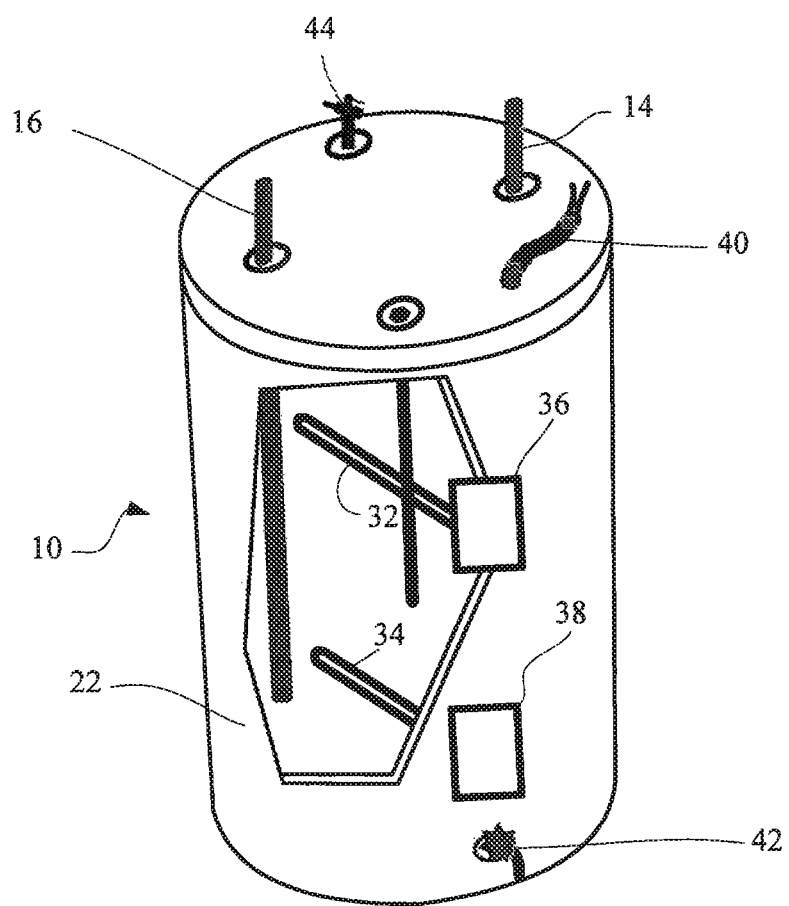
FIG. 1 illustrates an exemplary electrical hot water heater.

FIG. 1 illustrates one exemplary embodiment of a hot water heater 10 that may be utilized to heat water for residential and/or commercial applications. A portion of the sidewall is cut away to illustrate the internal components of the hot water heater. As shown, the hot water heater 10 is a electrical hot water heater that utilizes first and second electrical heating elements 32, 34 as a heat source for heating water within a storage tank 12. The elements are controlled by a thermostat (not shown), which activates the elements (e.g., completes a circuit) when a temperature within the tank 12 drops below a predetermined temperature. Typically, the tank 12 is disposed within an outer casing 22 that surrounds the tank. Insulation typically fills the space between the outer casing 22 and the tank 12.

In the present embodiment, both elements 32, 34 are disposed through threaded access openings (not shown) extending through the side of the tank 12. The elements 32, 34 are connected to an electrical conduit 40 which is connectable to an AC power source (e.g., 220 v). In this regard, external electrical connectors of the elements are interconnected to wiring of the conduit 40. This wiring extends between the tank 12 and casing 22. As shown, the external portions of these elements 32, 34 are covered by first and second plates 36, 38.

The cold water inlet 16 and hot water outlet 14 are threaded apertures into threaded couplings apertures or orifices in the tank. The external ends of the inlet pipe is connected (e.g., soldered) to a water supply pipe (not shown). The external end of the outlet pipe is connected to the plumbing that connects to hot water taps in the house (or other structure). The tank 12 stores heated water until a user opens a tap, which allows water to exit from the top of the hot water heater 10 through a hot water outlet 14. In conjunction with the water exiting the tank 12, water is introduced into the hot water heater via a cold water supply inlet 16. More specifically, the pressure of the inlet water is used to displace the hot water through the outlet 14 and downstream piping when a tap opens. Most commonly, the supply water inlet 16 extends into the tank to a location near the bottom of the tank 12. This partially isolates the inlet water from hot water within the tank, which rises to the top of the tank 12.

In addition to the openings in the tank for the inlet and outlet pipes, the hot water heater has several other access points or orifices. These orifices include a drain 42 disposed at or near the bottom of the tank 12. This drain includes a valve for use in draining/cleaning the tank. The hot water heater typically also includes a pressure relief valve 44 at or near the top of the tank 12. This valve 44 opens if the pressure in the tank exceeds a predetermined threshold. In this regard, if the water in the tank overheats, the valve is operative to open and relive excess pressure. Also included in the tank is an anode rod 48 that extends through the tank 12. The location and design of the anode rod varies. However, the purpose of any anode rod is to preferentially corrode to prevent corrosion of the tank. Such anodes may be powered or passive.

Figure 2:
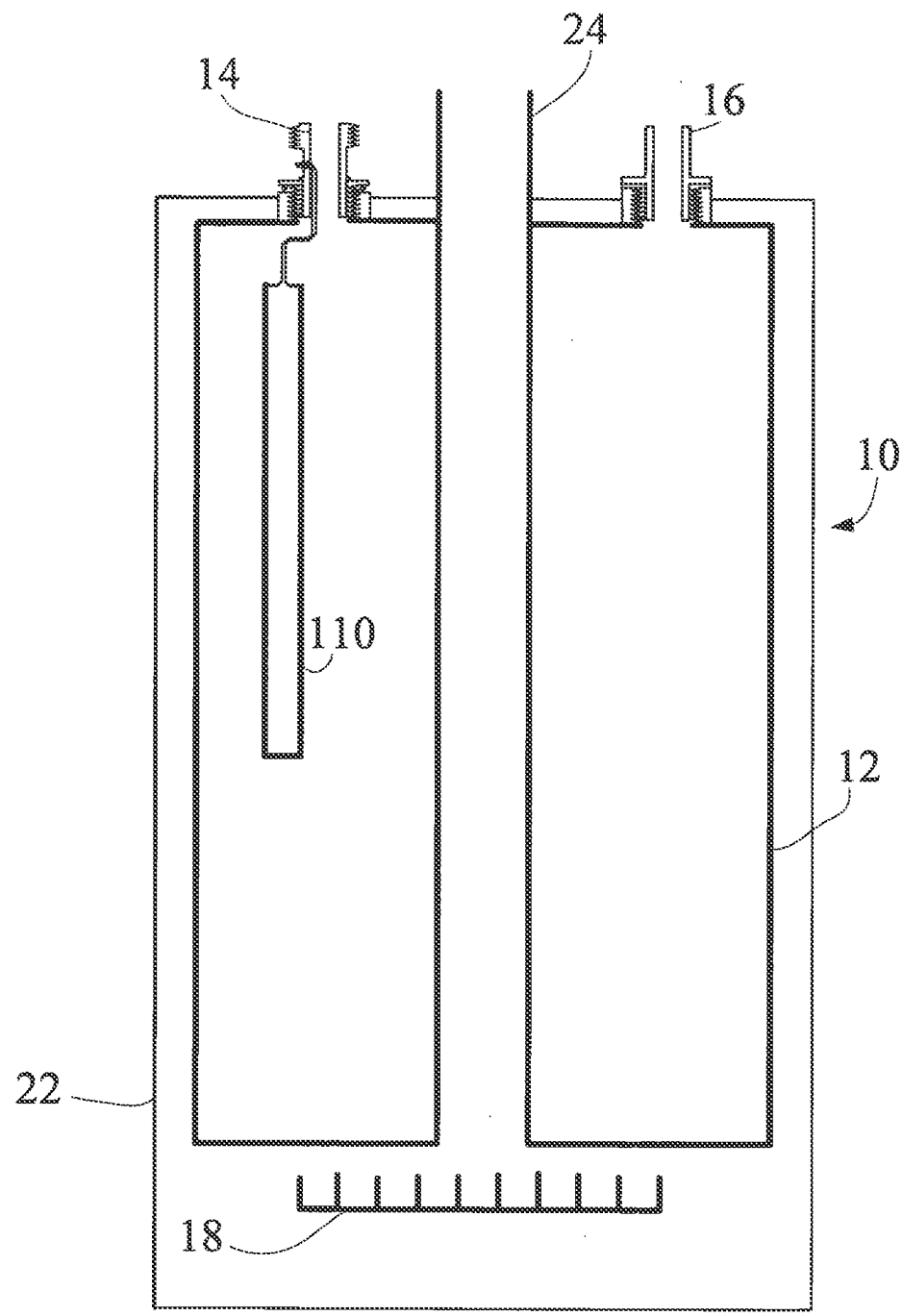
FIG. 2 illustrates an exemplary gas hot water heater including a supplemental heating element.

FIG. 2 illustrates a side cross-sectional view of a gas fired hot water heater. Like components have the same numbering as the hot water heater of FIG. 1. The gas fired water heater includes a burner 18 disposed below the tank 12, which is controlled by a thermostat, that to ignites when a temperature within the tank 12 drops below a predetermined temperature. The burner 18 may further include a standing pilot light, piezoelectric ignition system or other ignition system. Extending from above the burner 18 and through the center of the tank 12 is an exhaust gas chimney or internal flue 24. This internal flue 24 vents the combusted burner gases to an outside vent. In this regard, the internal flue 24 is typically interconnected to an external flue pipe (not shown) that extends from the hot water heater to an outdoor location to safely vent the combusted gases. It will be appreciated that the hot water heater may include various other components including, for example and without limitation, a pressure relief valves, drain valves, anodes, etc. Further, either of the exemplary water heaters of FIGS. 1 and 2 may be differently configured. For instance, the inlet and outlet pipes may enter and exit through, for example, side surfaces of the tank.

Aspects of the present disclosure are based on the realization by the inventor that various access points exist into most water heater systems. That is, most water heaters include water inlets and outlets, drains, pressure relief, recirculation, and/or anode rod access points. Accordingly, the present inventor has recognized that any of these access points may be utilized to insert a supplementary heating element into the water heater. The size and configuration of the heating element may be adapted to the particular access point for which it is designed. In any embodiment, a second heating element may be inserted into the water heater, in addition to or in conjunction with an existing heating element (e.g. electric element or gas burner), to improve the efficiency thereof. More specifically, such a supplementary heating element may be powered by a renewable power source (AC or DC) such that heat applied to the storage tank of the water heater may originate from, for example, a wind turbine or photovoltaic solar array.

Figure 3:
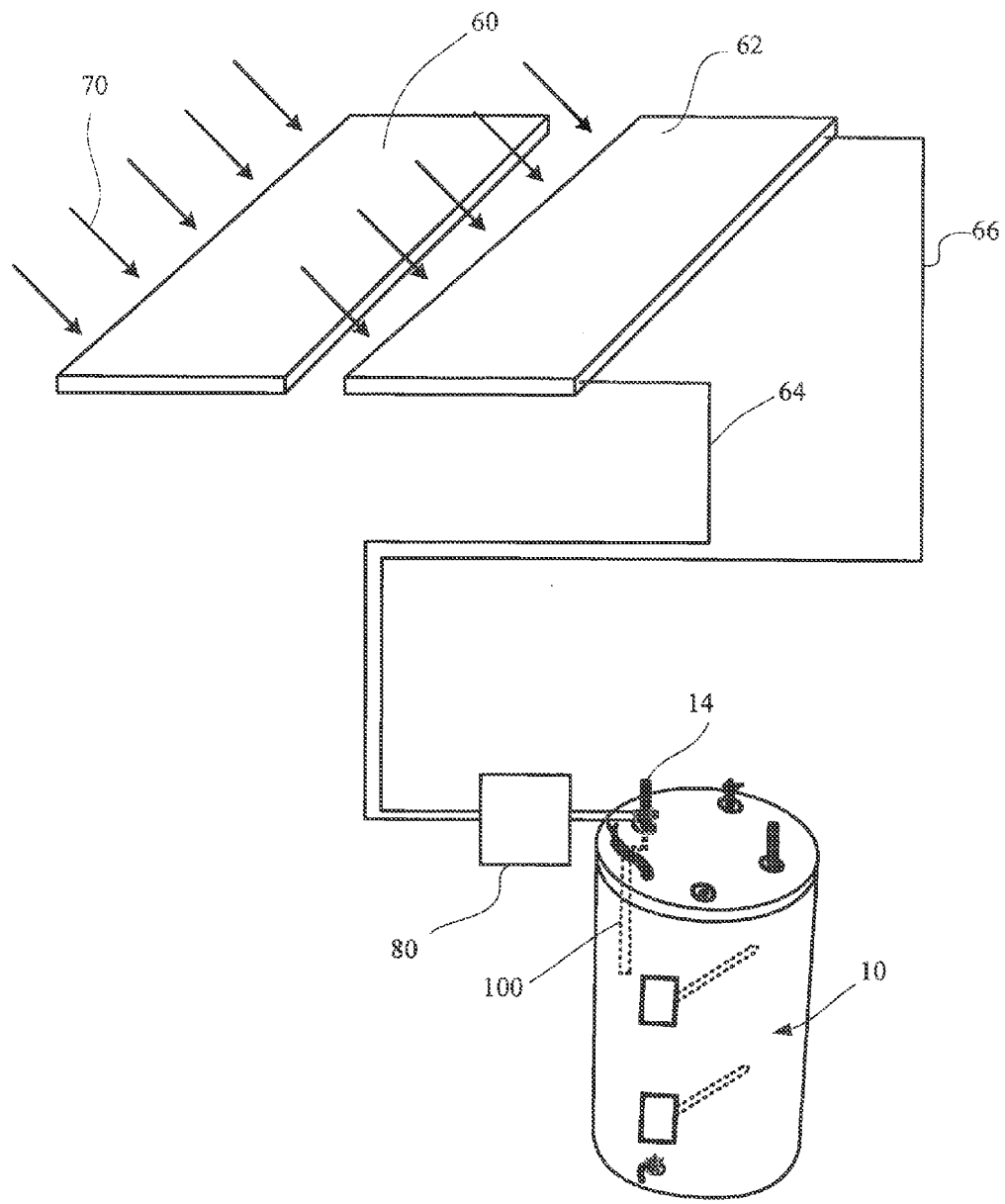
FIG. 3 illustrates an exemplary electrical hot water heater including a supplemental heating element that is connected to a renewable energy source.

One exemplary system in accordance with various aspects of the presented inventions is illustrated in FIG. 3. In this embodiment, first and second solar arrays 60, 62 are interconnected in series or parallel (as to be further discussed herein) in order to provide DC power (or AC power if an inverter is utilized) to a supplementary heating assembly 100 that may be retrofit into an existing water heater. In the present embodiment, the supplementary water heating assembly 100 is inserted into the hot water outlet 14 of the water heater 10. In one configuration, the heating element 110 of the supplementary heating assembly 100 is an element that is operative to generate heat in response to either an applied DC or AC current. In another embodiment, the element 110 may be a DC element. The inclusion of this heating element 110 into the hot water heater 10 allows for the direct application of DC voltage from a renewable energy such as PV arrays 60, 62 to the element 110, which heats the water in the tank 12 of the hot water heater 10. In this regard, no inverter is required to convert the DC power from the PV arrays 60, 62 into an AC current to generate supplemental heat for the hot water heater 10. Further, the heating element 110 is operative to provide heat to the tank of the hot water heater 10 in response to any applied voltage. Even in instances of low light, voltage will be generated by the PV arrays and result in a current in the heating element and the addition of heat to the water in the hot water heater 10. It will be appreciated that low light PV panels may be utilized that allow conversion of indoor ambient light into DC power (or AC power if an inverter is utilized). Such panels may allow for indoor mounting in, for example, industrial applications such that interior light may provide the light to initiate the photovoltaic effect of the PV panels. Other PV sources may include sources that generate DC power from parasitic light conditions. For instance, and not by way of limitation, such sources include paint, organic cells and building integrated photovoltaic (BIPV) applications.

In operation, the heating element 110 will necessarily be at the temperature of the water within the storage tank 12 of the hot water heater 10 and any energy passing through the element 110 will result in the addition of heat energy to the water within the tank 12. That is, the present system begins adding energy as soon as the PV arrays 60, 62 begin generating any voltage.

Such a system 200 has significant benefits in relation to a solar thermal system that introduce heated fluids into a heat exchanger in the water heater. In such solar thermal systems, collector panels typically heat a working fluid (e.g., liquefied salts, glycols, etc.) to a predetermined temperature and then a pump operates to circulate the fluids through the heat exchanger in the hot water heater. The working fluid within the collector panel is not circulated until the predetermined temperature is attained. Stated otherwise, the temperature of the working fluid has to be higher than the temperature of the water in the water heater to provide a large enough temperature difference (i.e., delta) between the working fluid and the water to effectively transfer heat there between. In this regard, such solar thermal systems have limited operating periods throughout the day. Furthermore, once the water in the tank of the water heater reaches a predetermined maximum temperature, such solar thermal systems must exhaust heat in the working fluid to another heat sink in order to prevent the working fluid from becoming overheated, which may damage the system. Alternatively, such systems may include a drain-back system to address overheating issues. Accordingly, such systems typically require complex plumbing, an electrical pump, and a liquid to liquid heat exchanger that allows for providing heat to the hot water heater 10. Such solar thermal hot water heating systems also require specially designed tanks in order to allow exchange of heat from the collector panels and the water within the tank. In this regard, the overall system discussed herein is simplified in relation to previous systems.

As shown in FIG. 3, radiation 70 from the sun is received on the photovoltaic arrays 60, 62. These arrays 60, 62 generate DC electrical power responsive to the solar radiation 70. The photovoltaic arrays include a large number of generally conventional photovoltaic cells, as well understood by those in the art. The present system 200 utilizes the DC power from the arrays that, in one embodiment, is applied directly to an electrical heating element 110 disposed within the tank. The element 110 is initially at the temperature of the water in the tank and therefore any current passing through the element raises its temperature and thereby heats the water in the tank. All that is required to interconnect the heating element 110 to the solar array 60, 62 are first and second electrical leads 64, 66. Though shown as separate leads, these leads, 64, 66 may be disposed in a common electrical cable (i.e., having two conductors and in some instances a ground wire) such that a single cable needs to be run from the PV array 60, 62 and simply plugged into the supplemental heat assembly 100. The ends of these lead 64, 66 may be wired with a plug that allows for simply plugging the array into a controller or directly to the heating element, either of which may have a mating plug (e.g., 3 prong with ground, etc.). In further embodiments discussed herein, the system may include additional control devices.

Figure 4A:
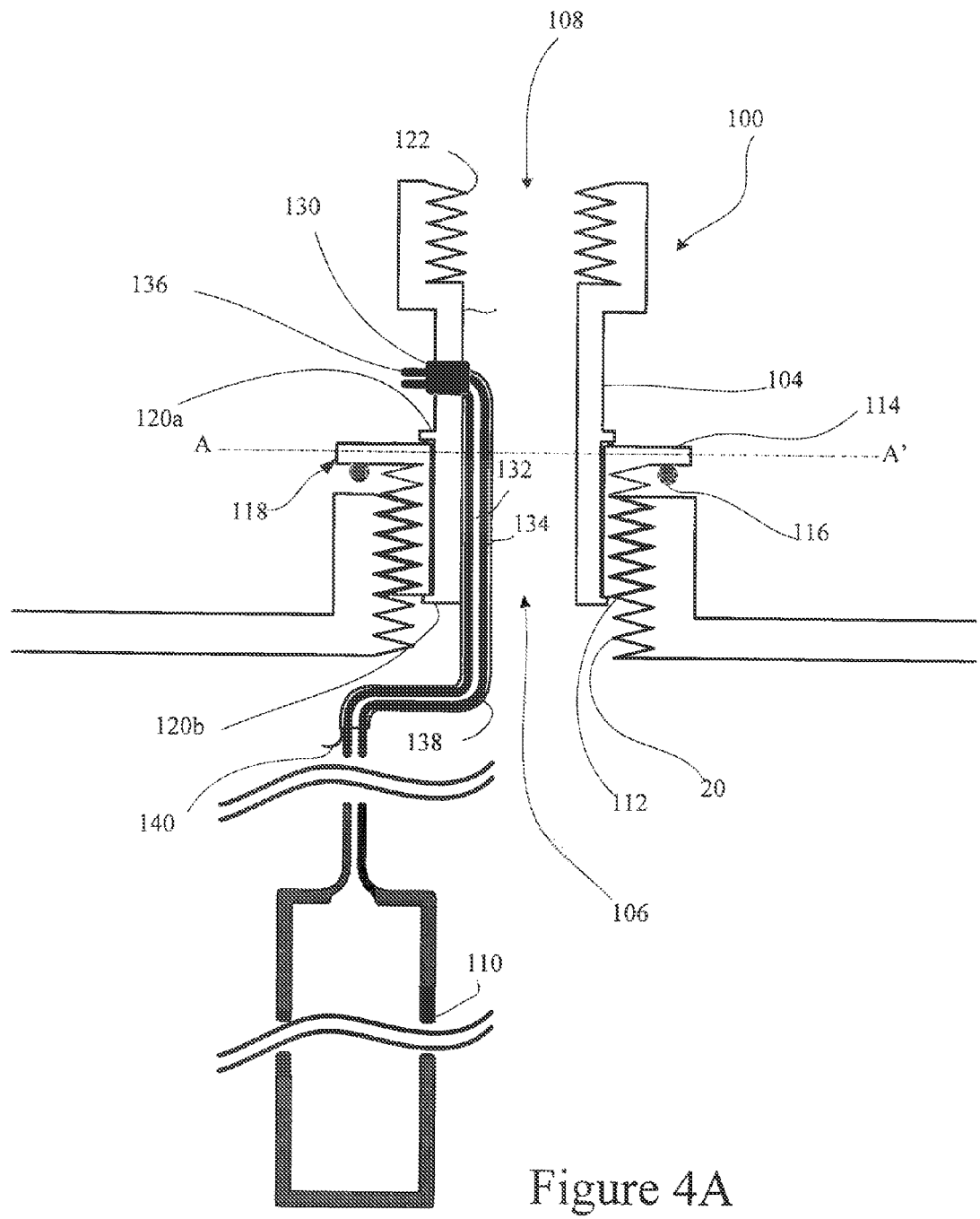
FIG. 4A illustrates one embodiment of a supplemental heating element.

FIG. 4A illustrates one embodiment of the supplemental heating assembly 100. In the illustrated embodiment, the assembly 100 is adapted for insertion into the inlet or outlet port of a hot water heater. However, it will be appreciated that other embodiments may be adapted for insertion into, a pressure relief valve opening, a drain valve opening, circulation port, an anode opening and/or a combination thereof. Accordingly, the following description is by way of example and not by way of limitation. As shown, the assembly 100 includes a tubular member 104 that is adapted for threaded insertion into mating threads 20 of an opening within a water heater to support an electrical element 110 within the tank. The size and configuration of the electrical element 110 may be selected based on the size of the tank, power rating of the renewable energy source etc. The tubular member 104 has a first open end 106 and a second open end 108 that define a fluid passageway there through. In this regard, the tubular member may be inserted into an opening within a water heater while still providing a flow path into or out of the water heater.

As shown, an insertion end of the tubular member 104 has a first set of threads 112 that are sized for mating engagement with the threads 20 of the water heater opening. The top end of these threads 112 includes a flange 114 that extends over the top surface of the threaded opening. Disposed beneath this flange for compression against the top surface of the threaded opening is a seal member 116. However, it will be appreciated in other embodiments the first set of threads need not necessarily have a flange or a seal member. That is, the threads may provide an adequate seal. In any case, when the first set of threads 112 are inserted into the threads 20 of the opening, the tubular member 104 forms a fluid tight seal with the opening within the water heater 10. In the present embodiment, the first set of threads 112 are formed on an outside surface of the tubular member 104 near the first open end 106.

In the present embodiment, the threads are formed on a flare nut 118. This flare nut 118 allows for the first set of threads 112 to rotate free of rotation of the tubular member 104. In such an arrangement, the flare nut 118 may be interconnected to the tubular member 104 via first and second annuluses 120A, 120B formed on the outside surface of the tubular member. The use of the flare nut 118 allows for positioning an offset heater element 110 within a tank of a water heater at a desired location and subsequent tightening of the flare nut 118 to maintain the heater element 110 at the desired location. However, it will be appreciated that other embodiments, the threads 112 on the insertion end of the tubular member 104, may be integrally formed on the inside surface thereof.

In the present embodiment, the tubular member 104 also includes a second set of threads 122 disposed proximate to the second open end 108. The second set of threads 122 allows for interconnecting the outlet end of the tubular member 104 to incoming or outgoing pipes, as the case may be. Though illustrated as having a second set of threads 122, it will be appreciated that other embodiments of the assembly 100 may have a second 'stub end' that is adapted for soldering or other connection to an inlet or outlet pipe. Though illustrated as a generally cylindrical tube, it will be appreciated that the tubular member 104 need not be straight. In this regard, the first and second open ends may be offset from one another and the tubular member 104 may have one or more bends therein.

Disposed through a side wall 102 of the tubular member 104 is a fluid type grommet or coupling 130. This coupling 130 provides a passageway through the sidewall 102 that allows first and second electrical leads 132, 134 to extend through the side wall 102 and pass through the first open end 106 of the tubular member 104. These leads, 132, 134 have first end that is electrically connected to the heater element 110. Second ends of the electrical leads 132, 134 extend through the coupling 130 and terminate in an electrical coupler 136. This coupler 136 may be formed as an electrical plug that allows for direct interconnection to the electrical lead extending from the PV arrays (See for instance FIG. 3) or a controller.

In the present embodiment, the first and second electrical leads 132, 134 are encased within a conduit 138 that extends from the coupler 130 through the first open end 106 of the tubular member and partway to the tank of the water heater 10. This conduit 138 may be interconnected to the inside surface of the tubular member 104. In one arrangement, the conduit is thin walled metallic tube that may be adhered or otherwise attached (e.g., soldered, welded etc.) to the inside surface of the tubular member 104. In this regard, the conduit 138 may have a rigidity that is in excess of the rigidity of first and second electrical leads 132, 134. The rigidity of the conduit 138 may provide structure that allows for offsetting the electrical element 110 from, for example, a centerline axis of the tubular member 104. In this regard, it may be beneficial to offset the electrical element 110 in order to selectively position the electrical element 110 within the tank of the water heater at a position that does not interfere with, for example, other electrical heating elements, anode rods etc. However, in other embodiments, the electrical coupling element 110 may be interconnected to the tubular member by another means such as a tensile member (e.g., cable, wire etc.).

In the present embodiment, in addition to providing access for the electrical leads 132, 134 the coupler 130 and conduit 138 also provide a passageway for a temperature sensor 140. This temperature sensor 140 may be any sensor that provides an indication of the temperature of the water within the tank. Non-limiting examples include thermocouples and thermistors. This temperature sensor may be interconnected to a controller 80 that is located outside of the water heater. See FIG. 3.

In its simplest form, the controller 80 may be a switch, relay or other circuit interrupting/breaking device that allows for generating an open circuit upon the water temperature within the tank 12 reaching a predetermined threshold. Creation of such an open circuit prevents power passing through the electrical element 110 and thereby prevents the introduction of additional heat, once the water heater reaches a desired temperature. As will be appreciated, by opening the circuit formed by the PV arrays, electrical leads 64, 66, 132, 134 and heater element 110, electricity generated by the PV arrays, 60, 62 cannot flow through the electrical element 110. However, unlike solar thermal systems that require continued pumping to prevent overheating of a working fluid, the simple opening of the electrical circuit renders the PV arrays inactive. That is, no additional remedial steps need to be taken once the circuit is open. However, power from the PV arrays remains available and may be applied to other uses or converted to AC energy and returned to the grid. Likewise, power from the PV array may be reapplied to the element 110 upon the temperature therein dropping below the desired temperature. In a further embodiment, as discussed herein, the controller may provide additional functionality for the system. However, in its simplest form the controller simply opens and closes the circuit between the PV arrays and the heating element once the temperature reaches a desired threshold.

Figure 5:
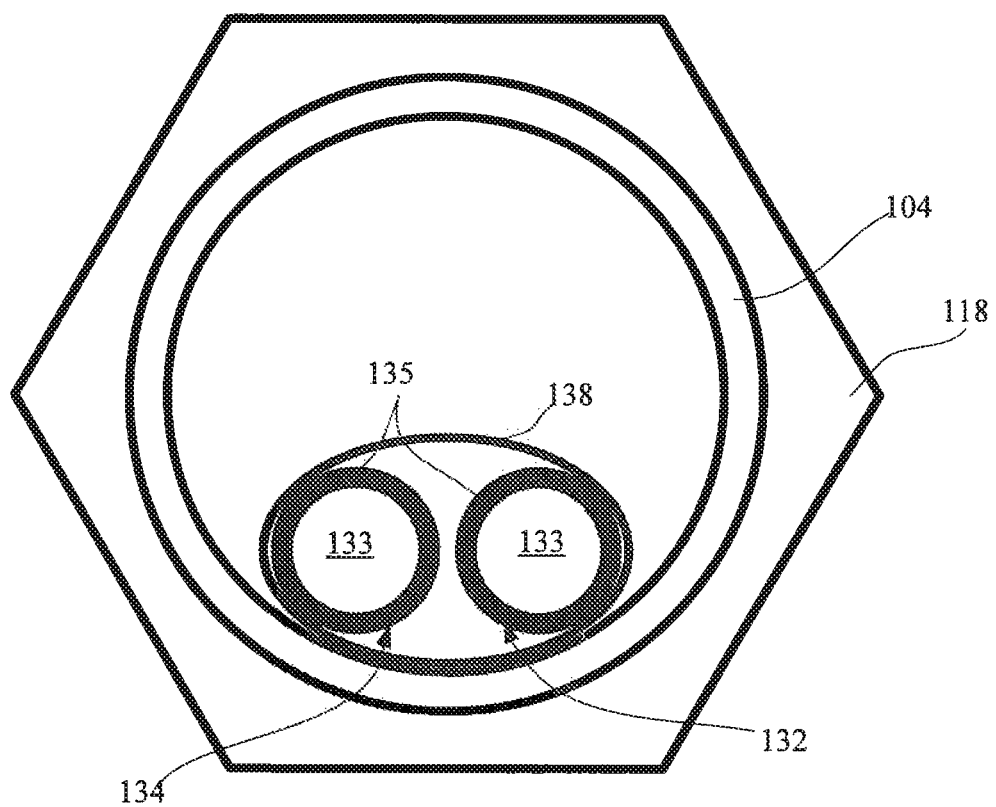
FIG. 5 illustrates a cross-section of the tubular connector of FIG. 4.

FIG. 5 illustrates a cross-sectional view of the tubular member 104 of section line A-A'. As shown, the conduit 138 houses the first and second electrical leads 132, 134 which each include an insulated outer covering 135 in a conductive core 133. A lead for the temperature sensor 140 may also pass through the conduit 138 (not shown). In order to stabilize these components within the conduit 138 the space between the electrical leads 132, 134 and the inside surface of the conduit may be filled with a potting material. However, this is not a requirement.

As shown, the conduit 138 is disposed against an inside surface of the tubular member 104. In other embodiments, no conduit 138 may be utilized and the first and second electrical leads 132, 134 may be interconnected to the inside surface of a tubular member 104. In any arrangement, it is desirable that the total cross-sectional area of the electrical connecting components (e.g., electrical leads, conduit etc.) be significantly less than that cross-sectional area of the passageway through the tubular member. That is, the tubular member has an inside area (e.g., diameter) that defines the first cross-sectional area. Likewise, the electrical connecting components have a combined cross-sectional area that defines a second cross-sectional area. Preferably, that the second cross-sectional area is less than about 40% and more preferably less than about 20% of the first cross-sectional area of the tubular member 104. As will be appreciated, when utilized in the inlet or outlet of a hot water heater, the tubular member 104 must allow water to ingress or egress the water tank. Accordingly, by reducing the cross-sectional area of the electrical connecting components, impedance of water flow through the tubular member 104 is reduced.

Figure 4B:
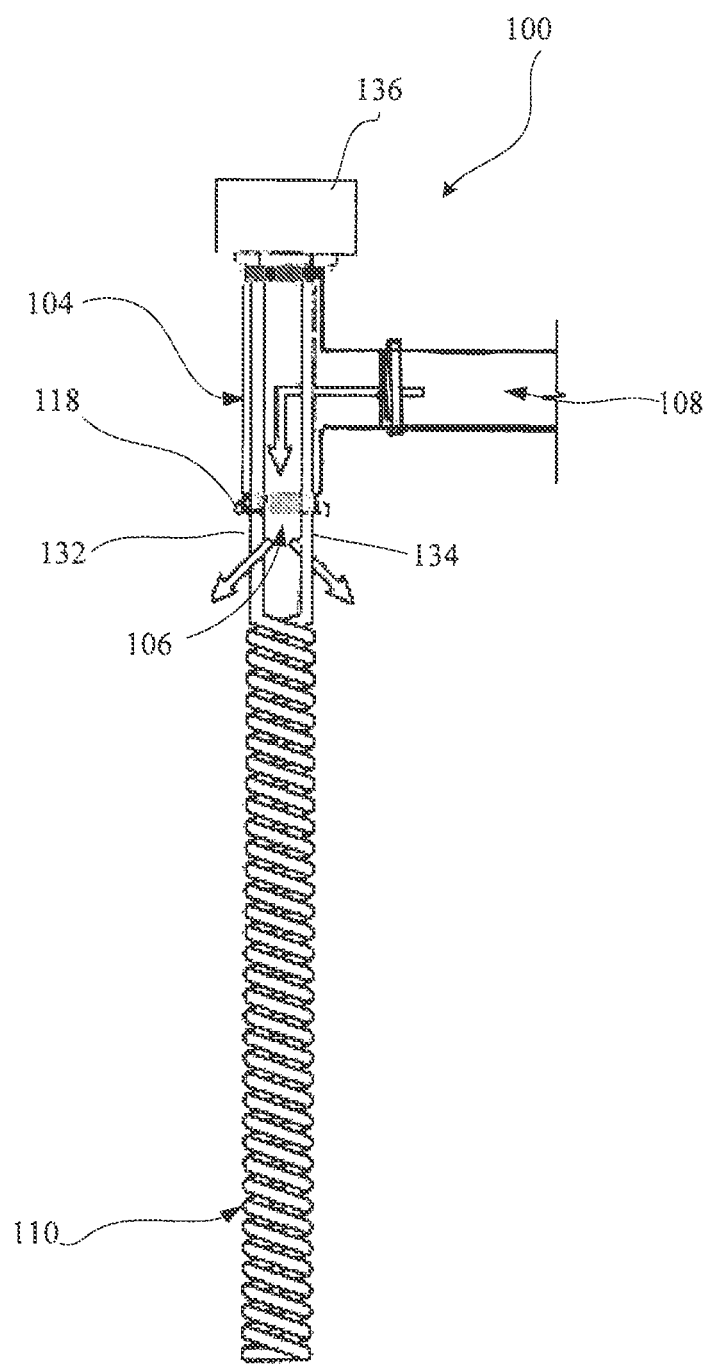
FIG. 4B illustrates another embodiment of a supplemental heating element.

FIG. 4B illustrates a further embodiment of a supplemental heating assembly 100. In contrast to the assembly of FIG. 4A, this assembly utilized a T-shaped tubular member 104. In this arrangement, one of the 'legs' of the T shaped member forms in the first open end 106 and a second leg forms the second open end 108. The third leg provide an sealed access port for the leads 132, 134 which connect the heating element 110 to the electrical coupler 136. In this embodiment, the heating element 110 is illustrated as a coiled element to increase its effective surface area. Such an arrangement may be utilized with all heating element discussed herein, though it is not a requirement. However, the sizing of the element is generally dictated by its surface area and use of a coiled element allows for increasing the surface area of the element in a space effective manner.

The ability to insert the heating assembly 100 into an existing water tank allows for retrofitting an existing water tank to utilize renewable energy. In this regard, it has been recognized that almost 30% of a typical household's energy use is consumed by heating water. The ability to retrofit an existing hot water heater with the heating assembly may significantly reduce the energy demands of an average household.

Figure 6:
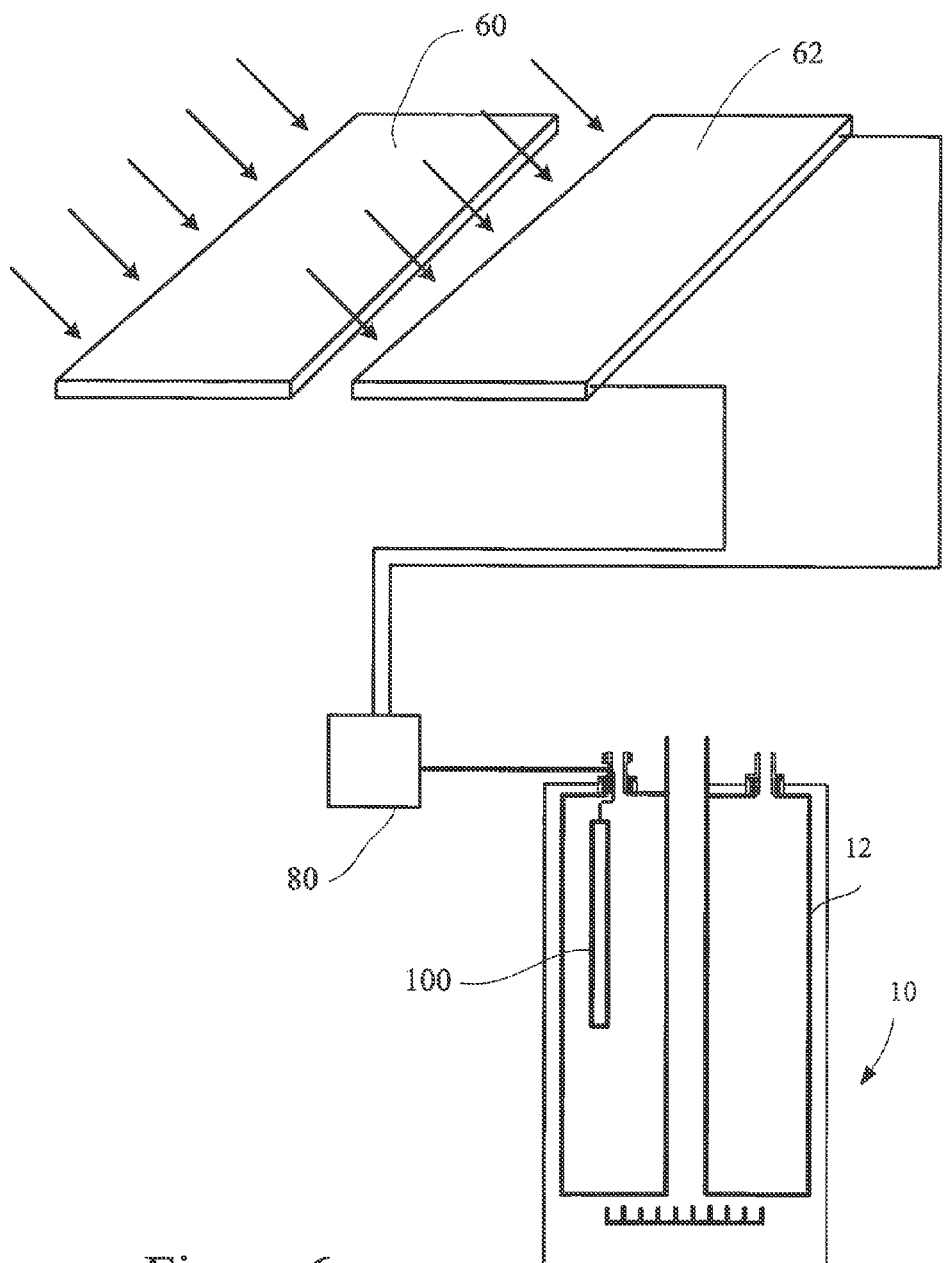
FIG. 6 illustrates an exemplary gas hot water heater including a supplemental heating element that is connected to a renewable energy source.
Figure 7:
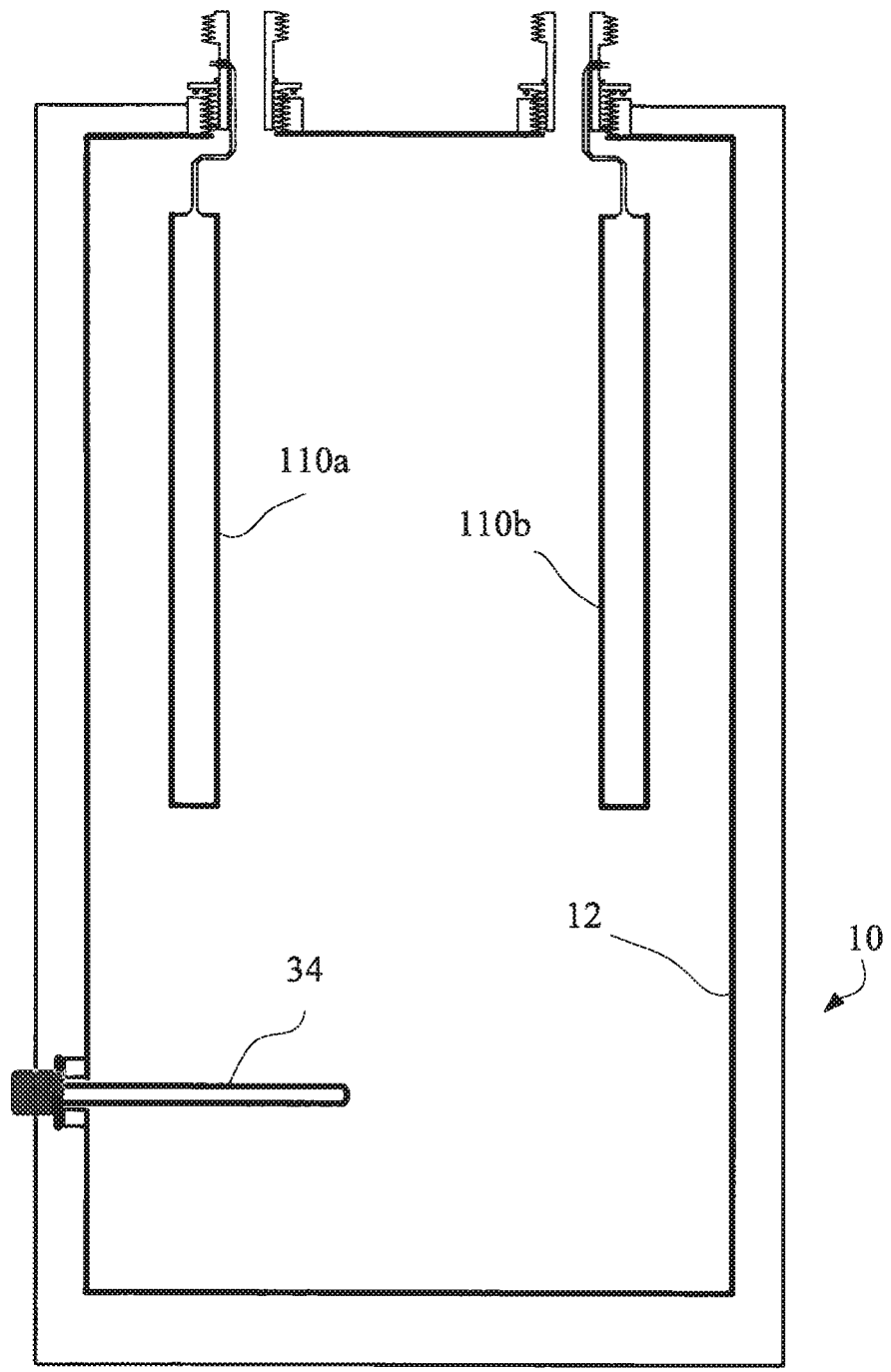
FIG. 7 illustrates an exemplary electrical hot water heater including two supplemental heating elements.

FIG. 6 illustrates the insertion of the heating assembly 100 into an existing gas fired hot water heater 10. FIG. 7 illustrates the insertion of a heating assembly into an electrical hot water heater that utilizes an electrical element 34 to heat the water within the tank. As is further illustrated by FIG. 7, the existence of multiple ingress and egress points into the hot water heater tank 12 may further allow the insertion of multiple elements 110A, 110B into the tank. In this regard, it has been recognized that the ability to place multiple elements into the tank may allow for creating convection currents within the tank. That is, it is common for hot water within a tank to stratify into different levels of temperatures. By placing different heating elements at different locations, it is possible to better mix and thereby provide a more uniform temperature of the water throughout the tank 12.

Outfitting existing or new gas water heaters with an electric element powered by local renewable energy sources allows this particular type of water tank to become very efficient. Further, gas water heaters can easily be retrofitted with this device. Given the fact that most gas powered hot water heaters utilize internal combustion originating from the bottom to middle of the tank, the ability to place an electric element in the upper portion of the tank allows both types of energy to be utilized separately, simultaneously or in conjunction with one another for optimum efficiency with minimal control. This could be due to time demands placed upon the fossil fuel resource by the provider or utility or by the occupant for the time of demand. For example, a common fired gas water heater with a DC or AC element powered by on-site PV, wind turbine or other renewable source, allows gas system to work only when the upper element cannot provide sufficient energy due to wind, irradiance, etc. This allows the system to function extremely efficiently as usage dictates and supply by renewable energy allows. This is due to the fact that the electric element in the upper portion of the tank will allow the upper tank to be heated first, and the sensor controlling the gas water heating is typically in the upper portion of the tank thus will not fire the gas system unless the demand exceeds the renewable resources available. This also allows a builder or owner to simply pre-wire for solar water heating at the time of tank installation for relatively little cost. Though shown with an electrical element near the top of the tank both elements could be placed in the lower portion of the tank with a proper controller interfacing with the burner (gas) and electric element. This solves a particular difficult issue of how to get renewable energy into a gas/fuel oil fired water heater without interfering with the existing gas heating system. When retrofit into existing tanks or incorporated into new tanks, the element connected to the renewable source can be set to a higher temperature and the element or burner connected to a fossil fuel source (AC or gas) can be set at a lower temperature such that the renewable energy powered element operates preferentially to the fossil fuel powered element. This can also be the case to provide renewable energy to an instantaneous type water heater or condensing boiler for preheated water by renewable energy. This can be done by attaching a supplement tank to the instantaneous water heater or "pre-feeding" such a system as is discussed in relation to FIGS. 9A-9C herein.

The supplemental heating element may be utilized to control the operation of the gas burner with minimal or no integration of the controllers of the supplemental heating element and gas burner. For instance, if the supplemental element is set at a temperature above that of the gas burner (e.g., 150 F for the supplemental element and 120 for the gas burner), the supplemental heating element will operate to heat the water to a temperature above the turn-off temperature of the gas burner. In this regard, the gas burner will cease operation and the supplemental element will continue to add heat energy to the tank. In operation, the gas burner will be on standby until the temperature of the tank falls below the gas burner set point (e.g., 120 F).

In a new water heater, it may be desirable to locate the supplemental electrical element in a lower portion of the tank so long as it does not interfere with the operation of the gas burner or its controls (e.g., thermostat). It will be appreciated that it is difficult for an electrical heating element to heat water that is at a location below the heating element due to stratification in the tank. Placing the supplemental heating element near the bottom of the tank allows the supplemental heating element to better heat a larger volume of water in the tank. Again, this allows controlling the gas burner with minimal controller integration. However, in a new (e.g., OEM) water heater with a gas burner and supplemental electrical heater (e.g., a hybrid water heater), the controls may be integrated and the burner and electrical heating elements may be placed anywhere. For example, such a hybrid water heater may have mid-tank of burner and electrical element located near the bottom of the tank or both heating elements could be located near the bottom of the tank.

The ability of the heating assembly to utilize electrical power from a PV source also allows for extending the use of the assembly to the duration during which there is ambient light on the PV arrays. In many instances, this extended duration operation allows for heating the tank to a desired maximum temperature without any use of the fossil fuel powered heater element (e.g., electrical or gas). As will be appreciated, a significant portion of most residential water use occurs in the morning and evening hours when people are showering. Often, during the daylight hours there may be little or no use of the hot water within the tank. In this regard, the heater assembly 100 may continue heating the water within the tank until a predetermined temperature threshold is met. Once temperature is achieved, one option is for the circuit to open and prevent the introduction of additional heat to the water in the tank. This open circuit solution, while effective, may result in the missed opportunity to acquire additional energy. That is, when the desired temperature of the tank is achieved, there may be a significant number of daylight hours left. Accordingly, the inventors have recognized that it would be desirable to store additional heat for recovery at a later time (e.g., after dark when household residents are showering). This may further reduce the need to heat the water utilizing the heater elements interconnected to public utilities.

To achieve additional heat storage, the inventors have recognized it would be beneficial to include a fusion pack with the water heater. See FIG. 8. The fusion pack 150 is formed of a phase change material that is adapted to melt and solidify at a predetermined temperature. Such phase change materials (PCMs) may store significant amounts of energy. More specifically, heat is absorbed or released when a PCM material changes from solid to liquid and vice versa. In this regard, PCMs are classified as latent heat storage units. The fusion pack 150, in one embodiment, incorporates a solid to liquid PCM. Initially, such a solid to liquid PCM behaves like a sensible heat storage material where the temperature of the material rises as it absorbs heat. However, unlike conventional sensible heat storage materials, when PCMs reach the temperature at which they change phase (i.e., their melting temperature) they absorb large amounts of heat at an almost constant temperature. That is, the PCM of the fusion pack 150 continues to absorb heat without a significant rise in temperature until all of the materials transform to the liquid phase. When an ambient temperature around the material falls, the PCM solidifies releasing the stored latent heat. Generally, PCMs can be tailored to have a desired melting temperature. Furthermore, they often store multiple times more heat per volume than water.

Figure 8:
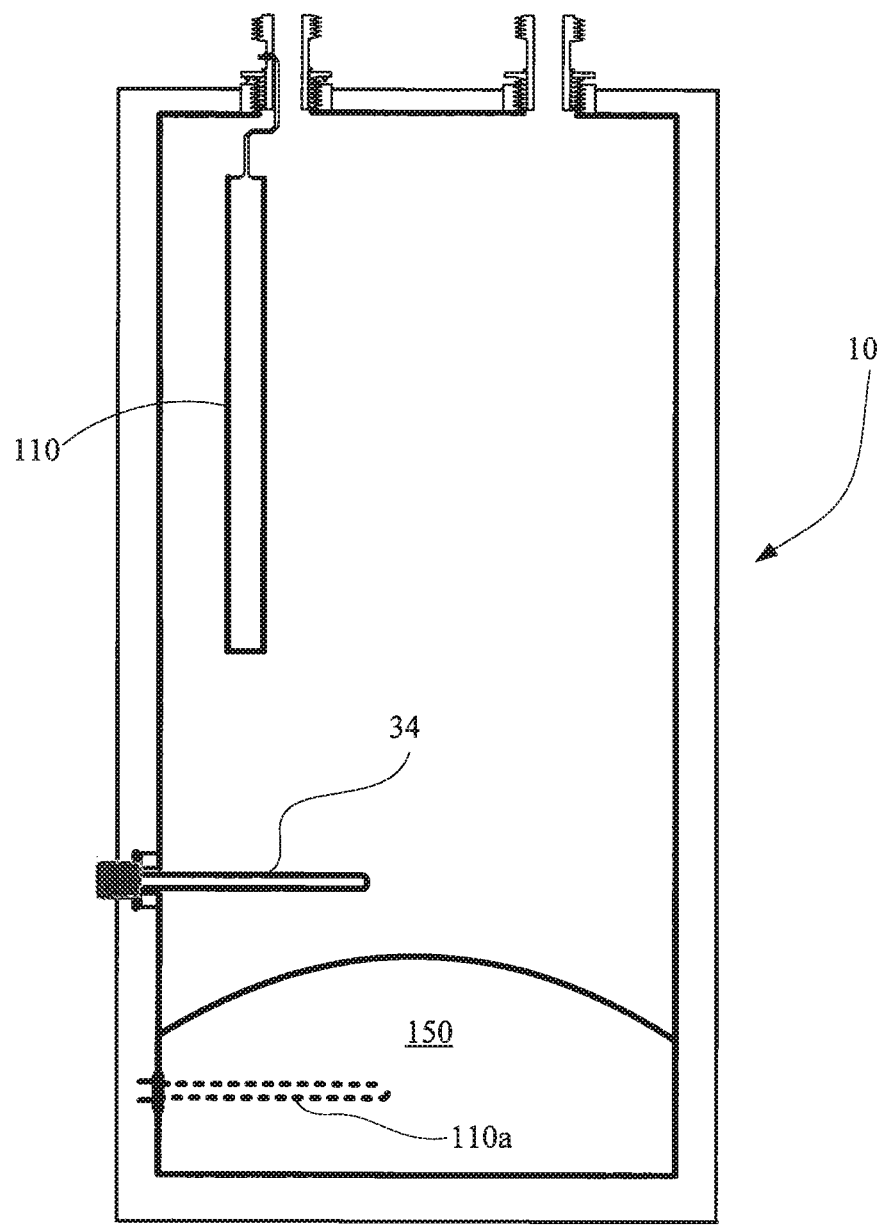
FIG. 8 illustrates illustrate an exemplary electrical hot water heater including a supplemental heating element and a PCM pack.

As illustrated in FIG. 8, the fusion pack 150 is disposed below and in conformal contact with the bottom of the tank 12. In this regard, as the water in the tank 12 heats, conduction through the bottom of the tank is applied to the top surface of the fusion pack 150. Accordingly, the fusion pack 150 absorbs this heat and the temperature of the fusion pack rises. To improve heat transfer throughout the PCM, fins, metal shavings or other highly conductive self supporting materials or structures may be admixed thought the internal area of the fusion pack 150.

Preferably, the melting temperature of the PCM within the fusion pack 150 will be a temperature that is slightly below the outlet temperature of the hot water heater. In this regard, the heater assembly 100 may apply heat to the water until the water is near the threshold for the tank. At this time, the PCM within the fusion pack 150 may begin to melt and thereby absorb significant volumes of heat. As will be appreciated, if the PCM can store five times as much heat as water, a fusion pack 150 having one fifth the volume of the water tank would allow for doubling the thermal storage within the tank. This allows for extending the usage period during which the free energy from the PV or other renewable source (AC or DC) source may be applied to the tank. When the water temperature of the tank begins to lower (e.g., water is being used from the tank) the fusion pack begins releasing heat back to the tank and hence heating the water therein.

In a further embodiment, the PCM material may also include a heating element 110a. See FIG. 8. In this regard, rather than receiving heat solely via conductance from the tank, heat may be applied directly to the PCM after the water in the tank reaches a desired temperature. In such an arrangement, the controller may switch the circuit from the heater element 110 in the water to the heater element 110a in the PCM once the water in the tank reaches a desired temperature. Accordingly, once the PCM reaches a threshold temperature, the controller may open the circuit with the PV array rendering it inactive, or switch the PV array to another use.

Figure 9A:
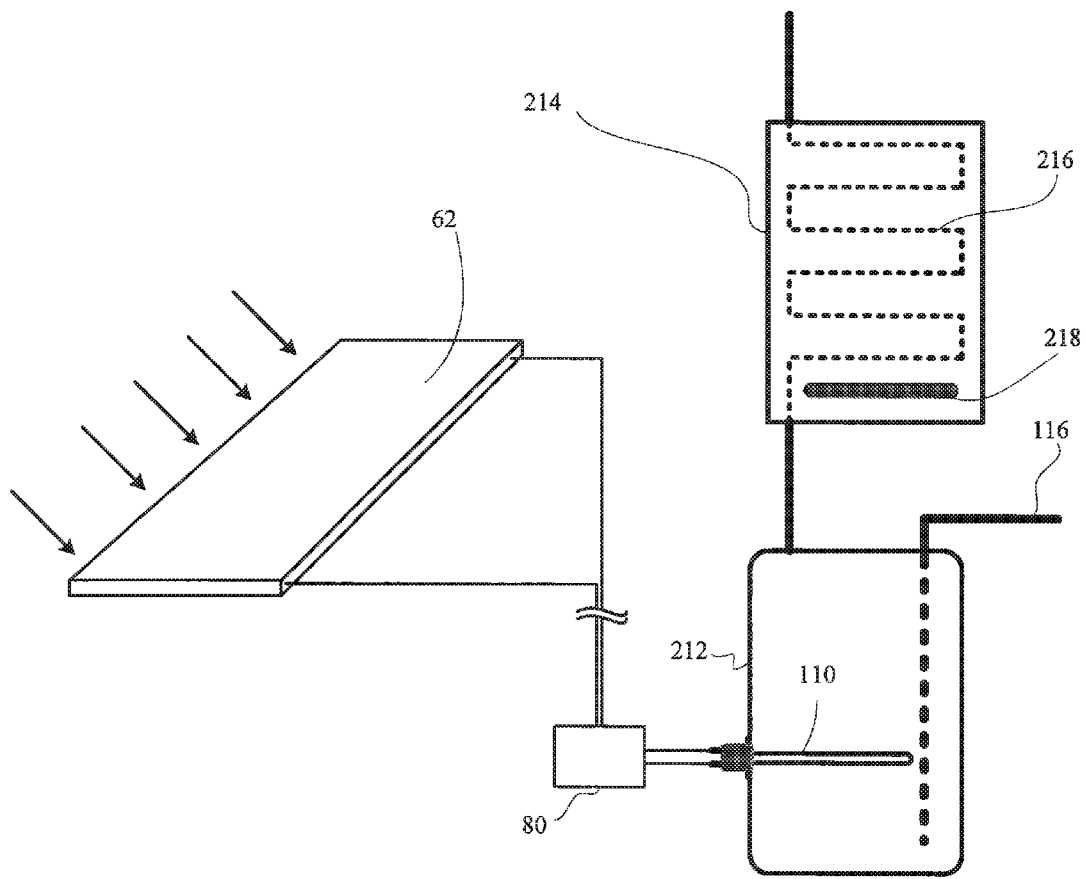
FIG. 9A illustrates an pre-heat system for use with a tankless hot water heater.

Another aspect of the present invention is illustrated in FIG. 9A. In this application, a pre-heat water tank 212 is utilized to elevate the temperature of water prior to the water passing through a tankless water heater 214. As will be appreciated, tankless water heaters, also called instantaneous, continuous flow, inline, flash, on-demand or instant-on water heaters, heat water as it flows through the device, and do not retain any water internally except for what is in the heat exchanger coil 216. When there is a demand for hot water (e.g. a hot water tap is opened) a water flow sensor senses the flow and starts the heating process. The water flow sensor sends a signal to a control board (not shown) which looks at multiple factors: incoming water temperature, desired water temperature as set on the temperature controller, and the calculates difference between the two temperatures. Depending on the calculated incoming and desired water temperatures, the gas or electric flow into the burner assembly 218 is modulated and the electronic ignition or electronic heating sequence begins. Water is heated to the desired temperature as it circulates through the heat exchanger coil 216 providing continuous hot water. When the hot water tap is turned off, the tankless water heater shuts down and is placed in a standby mode pending the next call for hot water.

Tankless water heaters provide improved efficiency as they do not maintain a storage of water at elevated temperature. However, these tankless water heaters use large bursts of energy while heating water due to the temperature difference between the incoming water and heated outlet water. Further, such systems are often infeasible in cold climates where the inlet water is below about 50° F. In these instances the temperature difference is too large to allow heating the water to a desired outlet temperature.

The system illustrated in FIG. 9A alleviates these concerns by preheating water in a storage/preheat tank 212 prior to its receipt by the tankless water heater. To allow such preheating, the preheat tank 212 includes a heater element 110 that is coupled to a PV array 62 other renewable energy source. When utilized with a PV array or other renewable energy source, the temperature of water within the pre-heat tank 212 may be raised during the day. Even if the temperature of the water within the preheat tank drops when renewable energy is not available, the water will not drop below ambient temperature where the pre-heat tank 212 is located. That is, water within the tank will typically be warmer than water received directly from the inlet 116 even early in the morning when the pre-the tank has not received energy from a PV array for a number of hours. Another example of usage for preheating would the use of a "booster" tank inside a boiler that could be outfitted with an electrical element utilizing renewable energy in either AC or DC mode. This particular boiler would not fire if the system temperature was hot enough in the tank and the fossil fuel consumption for standby and small usage would minimize firing. Such preheating tanks could be sized for estimated consumption and can either be internal to such units or external (pre-feeding) as in FIG. 9A.

Figure 9B:
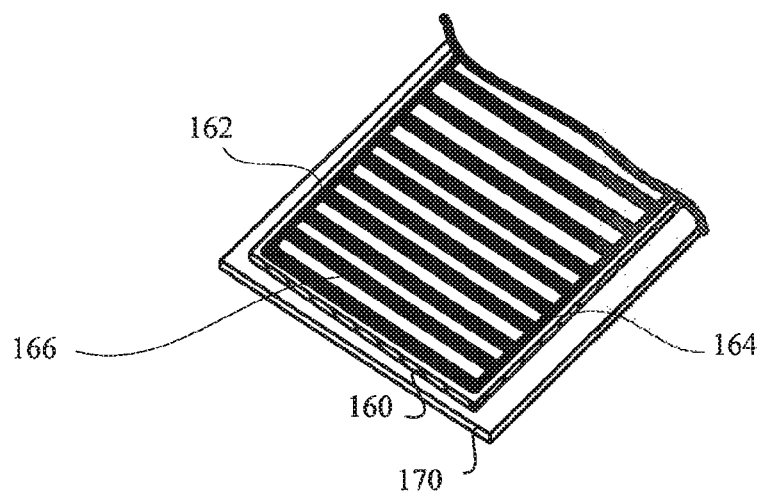
FIG. 9B illustrates an external heating element.
Figure 9C:
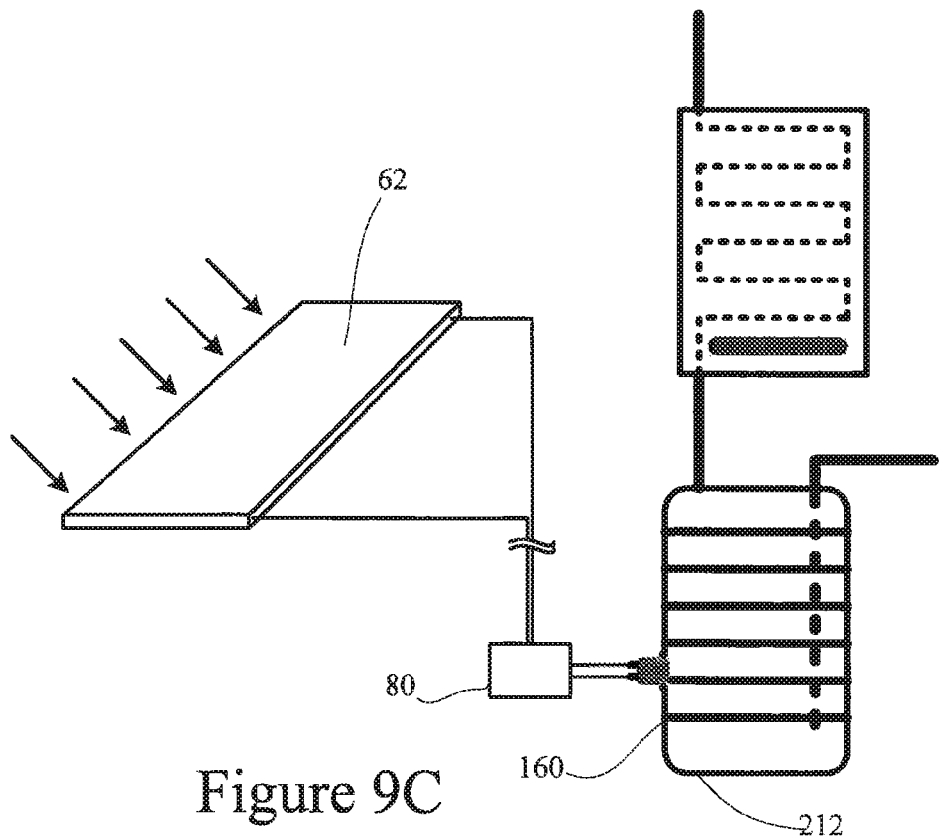
FIG. 9C illustrates a pre-heat system utilizing an external heating element.

FIGS. 9B and 9C illustrate a further embodiment of a pre-heat water heating system. As illustrated, this preheat water heating system utilizes an external heating element 160 that is formed of a sheet material (e.g., a thin-film heating element) that forms a jacket on an outside surface the storage tank. As shown in FIG. 9B, the heating element 160 has first and second bus bars 162, 164 running along opposing edges thereof. Extending between these conductors 162, 164 are a plurality of conductors 166. In one embodiment, these conductors are flat carbon conductors. Each of these conductors 166 effectively forms a resistor that generates heat in response to an applied voltage. One such thin film heating element is commercially available from CalorIQue, LTD of West Wareham, Mass. 02576. Disposed on a back surface of the element 160 is an adhesive membrane 170. The membrane 170 includes an adhesive surface that allows for attaching the membrane directly to the outside surface of the heating element 160. Further, the exposed edges of the membrane 170 may be utilized to adhere the heating element to the surface of a storage tank 212 as illustrated in FIG. 9C.

This embodiment allows for applying heat to a storage tank 212 without requiring the heating element being disposed within the interior of the storage tank 212. Further, use of such a jacket type heating element 160 allows for applying heat over a large area of the surface of the tank 212 and thereby improves application of heat to water within the tank 212. However, it will be appreciated that numerous other external heating elements may be utilized. Further, insulated materials may be applied to the outside surface of the jacket to further improve transfer of heat to water within the tank.

Figure 10:
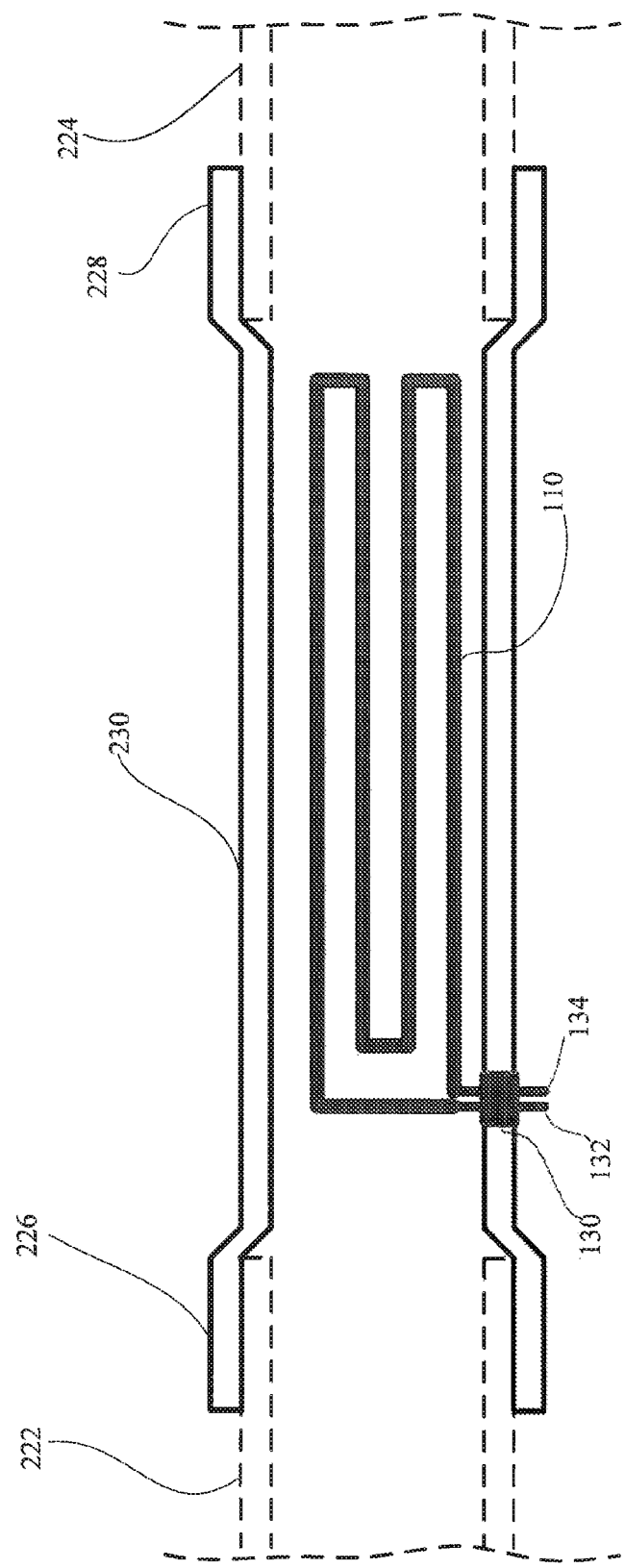
FIG. 10 illustrates an in-line heating system.

FIG. 10 illustrates a further embodiment of a heating element 220 in accordance with aspects of the presented inventions. As shown, this heating element 220 is adapted for in-line connection within a water flow path. Specifically, a tubular body 230 of the heater element 220 is adapted insertion between a first pipe 222 and a second pipe 224. In the present embodiment, the heater element 220 has first and second flanged ends 226, 228 that are sized to receive the ends of the first and second pipes 222, 224 in a slip fit arrangement. However, the ends of the heating element 220 may use other coupling arrangements, which are considered within the scope of the present invention. When connected between the first and second pipes, the tubular body provides a flow path there between. A T-shaped tubular body may be utilized similar to that discussed above in relation to FIG. 4B.

Disposed within the interior of the tubular body 230 is a heater element 110. This heater element 110 may be adapted for receipt of AC power and/or DC power from a renewable energy source. A coupling 130 extends through a sidewall of the tubular member 230. This coupling 130 allows first and second leads 132 134 to pass through the sidewall of the tubular body 230 in a fluid tight fitting. Again, these first and second leads 132 134 terminate in an electrical plug or coupling 136 that may be attached to a renewable energy source.

The heater element 220 illustrated in FIG. 10 is particularly suited for use heating water in applications where water re-circulates through piping. For instance, hot tubs and swimming pools often maintain a constant circulation of water through a filter and/or heater assembly to clean and heat the water passing there through. As with the embodiments disclosed above, the ability to insert heater element into this flow path allows for heating the water utilizing a renewable energy source. Furthermore, the system allows for easy retrofitting into existing systems as well as integration into new systems.

Figure 11A:
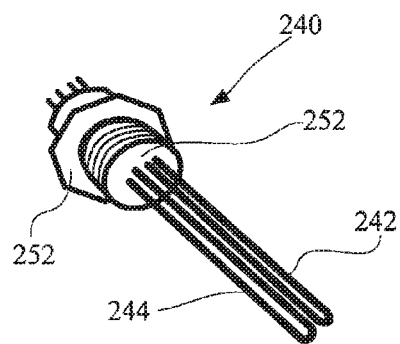
FIGS. 11A-C illustrate a dual element heating element
Figure 11B:
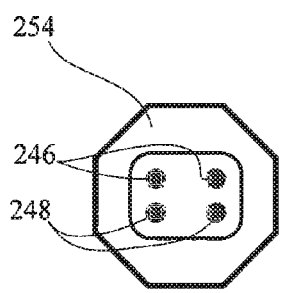
Figure 11C:
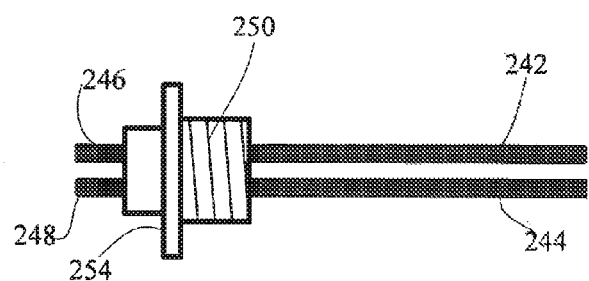

FIGS. 11A-C illustrate a further embodiment of a heating element that may be utilized to interconnect a water heater to a renewable energy source. As shown, this heating element assembly 240 includes a first heating element 242 and a second heating element 244. The heating elements 242, 244 are interconnected to a inside surface 252 of the threaded body 250. Each of these elements 242, 244 are interconnected to electrical connectors 246, 248, respectively, disposed on an outside surface 254 of the threaded body. In this regard, the electrical connectors 246, 248 pass through the interior of the threaded body 250 to electrically connect to the first and second heating elements 242, 244.

The threaded body 250 is adapted for insertion within a threaded orifice of a hot water heater. In one embodiment, the heating element assembly 240 is adapted for receipt within an existing hot water heater heating element orifice. This allows for removal of an existing hot water heating element from, for example, an electric hot water heater that is adapted for use with an AC power source. Once the hot water heating assembly 240 is disposed within the orifice of the hot water heater, both elements are disposed within the tank of the hot water heater and the first heating element 242 may be interconnected to a first power source, and the second heating element 244 may be interconnected to a second power source via the first and second electrical conductors 246, 248. For instance, the first heating element 242 may be interconnected to an AC power source, and the second heating element may be connected to a renewable power source. Once connected to their respective sources, the heating elements 242, 244 may be selectively operated or operated simultaneously.

The dual element heating assembly 240 permits retrofitting existing electrical hot water heaters for use with renewable energy systems. However, it will be appreciated that OEM hot water heaters may be provided with the dual element heating assembly 240. Further, the first and second heating elements may be interconnected to any separate power sources. In this regard, the first heating element may be interconnected to a wind turbine, and the second heating element may be interconnected to a PV array.

It will also be appreciated that the heating element assembly 240 may be incorporated into a gas-fired hot water heater. In this regard, such a hot water heater may be interconnected to three power sources, a gas power source, an AC power source, and a renewable energy power source. In such an arrangement, a controller may selectively utilize any of the power sources based on one or more of the factors. For instance, such a controller may deactivate the AC power source and/or the gas burner when receiving energy above a predetermined level from the renewable energy source. Alternatively, when AC power costs are low (e.g., at night), the controller may operate the AC element and deactivate the gas burner if it is determined to be cost effective. In this later regard, the controller may determine which energy source provides more cost-effective heating for water within the tank.

FIGS. 1-11 above illustrate various concepts of a renewable energy heating system that may be utilized for water heating applications. Discussed below are control processes that may be utilized with the system to provide further benefits.

As noted above, power from the array 60, 62 or other renewable energy source is supplied to a controller 80 that controls the connection with the heating element 110 within a hot water heater 10. The controller 80 may comprise solid-state switches or relays controlled by switching signals in response to one or more sensors (e.g., temperature sensors). Further, the controller may be operative to affect the operation of the PV array in response to a radiation intensity signal from a photovoltaic sensor 70. Such a sensor 70 may be a discrete sensor that is separate from the array(s) 60, 62. However, the power actually output by the arrays 60, 62 can also be measured, for example, with respect to a small number of the cells of the arrays 60, 62, and used as the radiation intensity signal provided to controller 80.

The ability to monitor the PV arrays allows for improving the efficiency of the array. In one arrangement, the controller includes a Maximum power point tracking (MPPT) module. MPPT is a technique that grid tie inverters, solar battery chargers and similar devices use to get the maximum possible power from one or more solar panels. As will be appreciated, solar cells have a complex relationship between solar irradiation, temperature and total resistance that produces a non-linear output efficiency known as an I-V curve. It is the purpose of the MPPT system to sample the output of the cells and apply the proper resistance (load) to obtain maximum power for any given environmental conditions.

Other components of the controller 80 are within the skill of the art and are within the scope of the present invention. For example, controller 80 might readily comprise an analog-to-digital converter for converting the signal proportional to the incident radiation provided by a sensor or PV panel to a digital value and a microprocessor or similar device for accordingly control one or switches and/or heating elements. The controller 80 is also operative in some embodiments to reconfigure the photovoltaic array 60, 62 (by altering the connection of groups of cells from series to parallel, for example, and vice versa) so as to alter the power characteristics of the array.

FIG. 11 illustrates a controller 80 that may be utilized in conjunction with the renewable heating energy devices disclosed above. As shown in FIG. 11, the controller includes an electronic switching circuit 82 that receives power from the renewable energy source (e.g., PV array 60) and an outlet 54 that is interconnected to the supplemental heating assembly 100. The electronic switching circuit may include various switches (e.g., solid state switches, etc.) that allow for selectively completing or opening the circuit between the renewable energy source 60 and the heating assembly 100. The controller 80 further includes a processing unit 86 that includes a processor 88, memory 90 and one or more input/output interfaces. The processor 86 may perform various control operations that are stored within volatile and non-volatile memory. For instance, the processor 88 may implement the maximum power point adjustments to enhance the power output of the renewable energy source 60.

In any arrangement, the processor 88 can execute software or other executable code/logic stored in the memory 90. The software/logic stored within the volatile memory may also allow the processor to monitor power produced by the renewable energy source 60 and communicate this power generation to the heater element. The processor may also be connected to a communications interface that may be represented by a variety of different devices. In this regard, the controller may be interconnected to a data network via, for example, Ethernet, RS485, SD card, a USB connection and/or a telephonic connection (e.g., cellular or landline.) In this regard, the controller may be interconnected to external systems that may interact with and/or provide further control inputs to the controller.

The controller also includes a display 94 and a user input device 96. The display 94 allows for displaying system operation parameters. For instance, in one embodiment the display 94 allows for displaying a temperature of the water within the tank. Furthermore, through the user input 96, a user may selectively adjust a maximum threshold temperature for the supplementary heating element and/or water in the tank. In this regard, a user may regulate the maximum temperature within the tank and thereby the maximum output temperature of the water within the tank. In a further arrangement, the controller may output information and receive information from a remote terminal. For instance, the controller may connect by, for example, Wi-Fi to a user's home computer which may provide user interface.

Figure 12:
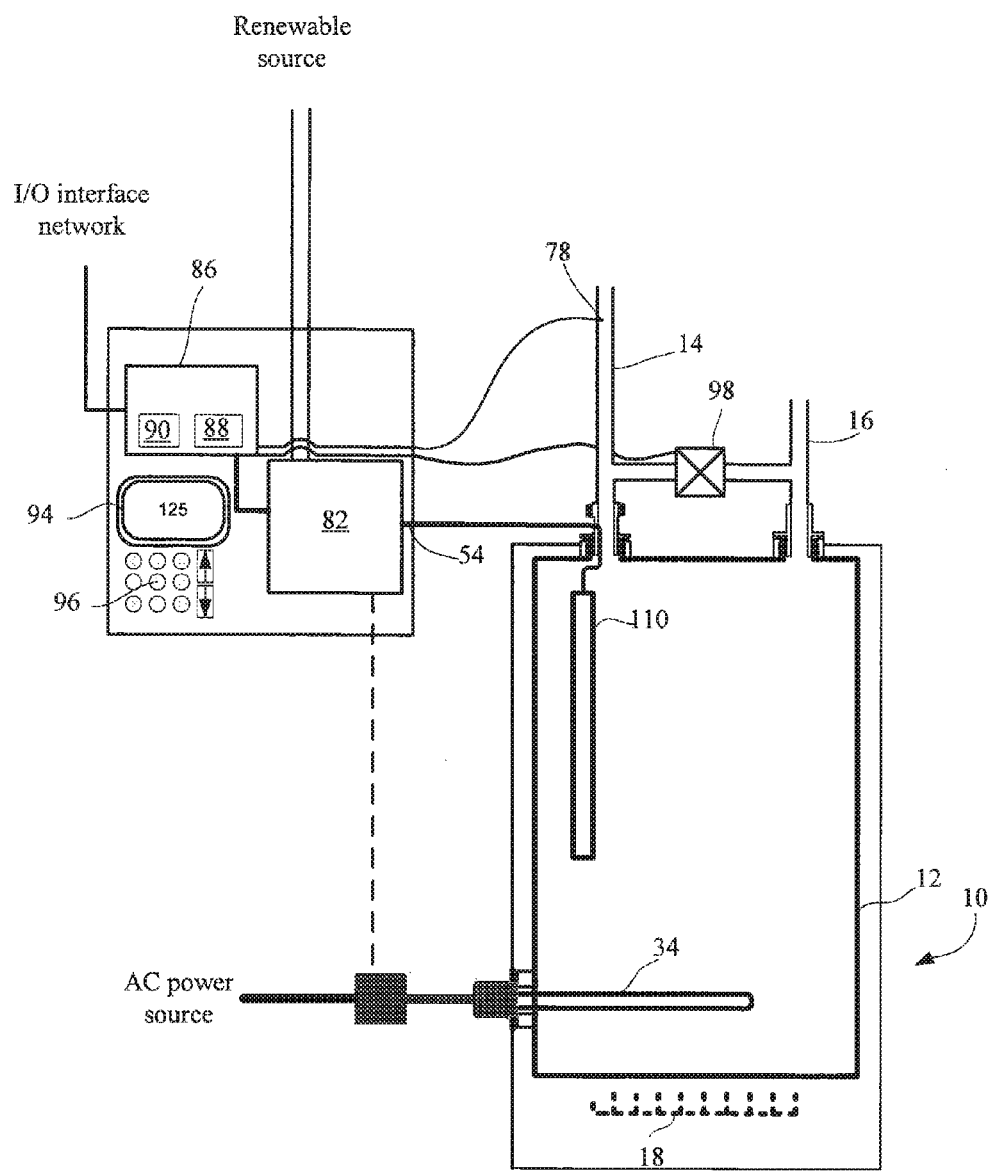
FIG. 12 illustrates an exemplary controller and a mixing valve connected to a hot water heater.

In a further embodiment, the controller 80 allows a user to select a maximum output water temperature that is separate from the temperature of the water within the tank. In this arrangement, to regulate the output temperature of the water from the water tank, the water tank further incorporates a mixing valve 98. See FIG. 12. This mixing valve 98 is interconnected between the water inlet 16 and the water outlet 14 of the tank 12. The valve 98 allows for mixing unheated water from the inlet pipe 16 with water exiting the outlet 14 of the hot water heater 10. In this arrangement, the outlet 14 may include a temperature sensor 78 downstream from the mixing valve 98 such that the valve may be opened and closed to generate a desired downstream temperature. Alternatively, such a mixing valve may be disposed in-line with the hot water outlet and moderate temperature by selectively opening and closing the port to the hot water. As will be appreciated, such a system allows for heating the water in the tank to a higher temperature while maintaining a lower maximum output temperature. That is, the water within the tank may be heated to a higher temperature (e.g., 150°) while the maximum outlet water temperature is maintained at a lower level (e.g., 110-120°). Accordingly, the controller 98 may utilize this information to control the mixing value to achieve this desired output temperature. The user may set the desired output temperature via the display.

The controller 80 may also be interconnected to the standard heating element 34 of the hot water heater (or 18 in the case of a gas hot water heater), which is interconnected to a utility or fossil fuel power source. In this arrangement, the controller 80 implements logic that allows for controlling both the supplementary heating element 110 and the standard heating element 34 of the hot water heater 10.

In one arrangement, the controller includes logic that allows the controller 80 to determine usage times for the hot water heater. To identify usage patterns the controller is interconnected to a sensor (e.g., flow sensor) that identifies when water flows out of the hot water heater 10. This sensor may be incorporated into the temperature sensor that identifies downstream temperatures exiting the hot water heater. Alternatively, this may be a separate sensor. Over time, the logic identifies usage times and utilizes this information to selectively operate the heating elements. For instance, the controller 80 may identify the primary usage periods between 6 am and 9 am in the morning and between 5 pm and 9 pm in the evening. Based on the usage patterns, the controller 80 may deactivate the standard heating element 34 between the hours of 9 am and 5 pm such that the only energy input to the hot water heater during this period is provided by the renewable energy source. As will be appreciated, if hot water is utilized between 8:30 am and 9 am, the water in the tank will be below the threshold level and typically the standard heating element 34 or in the case of a gas heater the burner would operate to bring the temperature of the water back to the threshold level. However, if there is no anticipated usage of water for a predetermined or user settable period (e.g., an hour) and renewable energy is being received from the renewable energy source, the controller may deactivate the standard element/burner to allow heating to be provided by the renewable energy source. Variations exist in this methodology. For instance, if a tap is open water begins to flow out of the hot water heater, the controller may re-initiate operation of the standard element. In a further arrangement, if the controller is programmable such that a user (e.g., homeowner) may set the times during which the standard element or burner is to be inoperative.

As noted above, the controller 80 may be interconnected to a network via its output port. In this regard, the controller itself may be interconnected to, for example, a local utility. The local utility in this arrangement has the ability to selectively deactivate the standard heating element 34 that is interconnected to the utility. For instance during periods of high energy demand (e.g., daytime in the summer when air conditioning levels are high) the utility may deactivate all electric elements of some or all hot water heaters interconnected to their system to reduce the overall load on the grid. The same may be true for gas fired burners in another arrangement.

In a further arrangement where the system includes an inverter, power from the renewable energy source 60 may also be diverted to the grid at the control of a power provider or utility (e.g., electric company). In this arrangement, in addition to be able to shut off the standard heating element connected to the utility, energy from the renewable energy source may be diverted into the grid to provide additional energy during peak demand times. As will be appreciated, return of such energy to the grid may allow the homeowner (or other user) to sell energy back to the utility during peak demand times (e.g., net meter). Likewise, in further embodiments, the controller is operative to divert energy into the grid once the temperature within the water tank and/or PCM material reaches a desired maximum threshold. At such time, rather than simply opening the circuit such that the renewable energy source is inactive, the energy from the source may be diverted into the grid to the benefit of the owner of the system.

The ability to interconnect the controller to an outside network also allows the use of the system to generate of renewable energy certificates (RECs). RECs, also known as Green tags, Renewable Energy Credits, Renewable Electricity Certificates, or Tradable Renewable Certificates (TRCs), are tradable, non-tangible energy commodities in the United States that represent proof that 1 megawatt-hour (MWh) of electricity was generated from an eligible renewable energy resource (renewable electricity). Solar renewable energy certificates (SRECs) are RECs that are specifically generated by solar energy.

These certificates can be sold and traded or bartered, and the owner of the REC can claim to have purchased renewable energy. In states that have a REC program, a green energy provider is typically credited with one REC for every 1,000 kWh or 1 MWh of electricity it produces (for reference, an average residential customer consumes about 800 kWh in a month). Further, a number of states are currently mandating that utilities provide a minimum portion of the energy they supply from renewable energy. These minimum renewable energy requirements are set to increase in coming years in a number of states.

In order to produce RECs or SRECs, a system must first be certified by state regulatory agencies, usually public service commissions or public utility commissions, and then registered with a trading platform. Once a system is certified with the state agency and registered with a trading platform, SRECs can be issued using either an estimate table or actual meter readings by the trading platform—depending upon state regulations. Accordingly, the above noted systems of FIGS. 1-11 may be certified prior to or after installation to allow for the tracking of renewable energy and the creation of RECs and/or SRECs.

In this embodiment, the controller 80 is operative to monitor the amount energy generated by the renewable energy source and report this information to the user, a trading platform, device seller, device installer or utility (any of which may report to a trading platform). As will be appreciated, these devices themselves each may produce a small amount of energy, but the aggregation of these amounts to produce RECs may have significant value to the owner of the RECs. For instance, a device installer, device seller, manufacturer, utility or other entity (i.e., third party) may provide rebates to customers installing the renewable heating devices in exchange for the future rights to the RECs generated by the devices. Thus, the third party may, but need not necessarily, subsidize the cost of the devices and recoup this investment in the future based on the generation of RECs/SRECs. In this arrangement, the third party may bundle the renewable energy reported by multiple systems to amass RECs. This allows the utility to generate the RECs that may be applied to their renewable energy requirements or sell the RECs to other entities.

It will be appreciated that the controller may have functionality in addition to those discussed above. For instance, the controller may provide feedback to the owner of the system. In one arrangement, the controller may provide instant cost/consumption information to the user. Such information may allow the user to control their energy uses. This information may include electrical cost information for energy received from a utility provider, which in some regions varies throughout the duration of the day. That is, electrical power may be cheaper during low demand times and more expensive during high demand times. Accordingly, feedback may be provided to the user that allows the user to determine when a utility connected electrical heating element (or potentially gas-fired element) should be deactivated. Further, the controller may provide feedback regarding the savings and/or credits accumulated by the user of the system. All of this information may provide feedback that allows for consumptive patterns to be modified to produce desired results (e.g., energy saving, reduced carbon footprint, etc.) through greater energy awareness.

Figure 13:
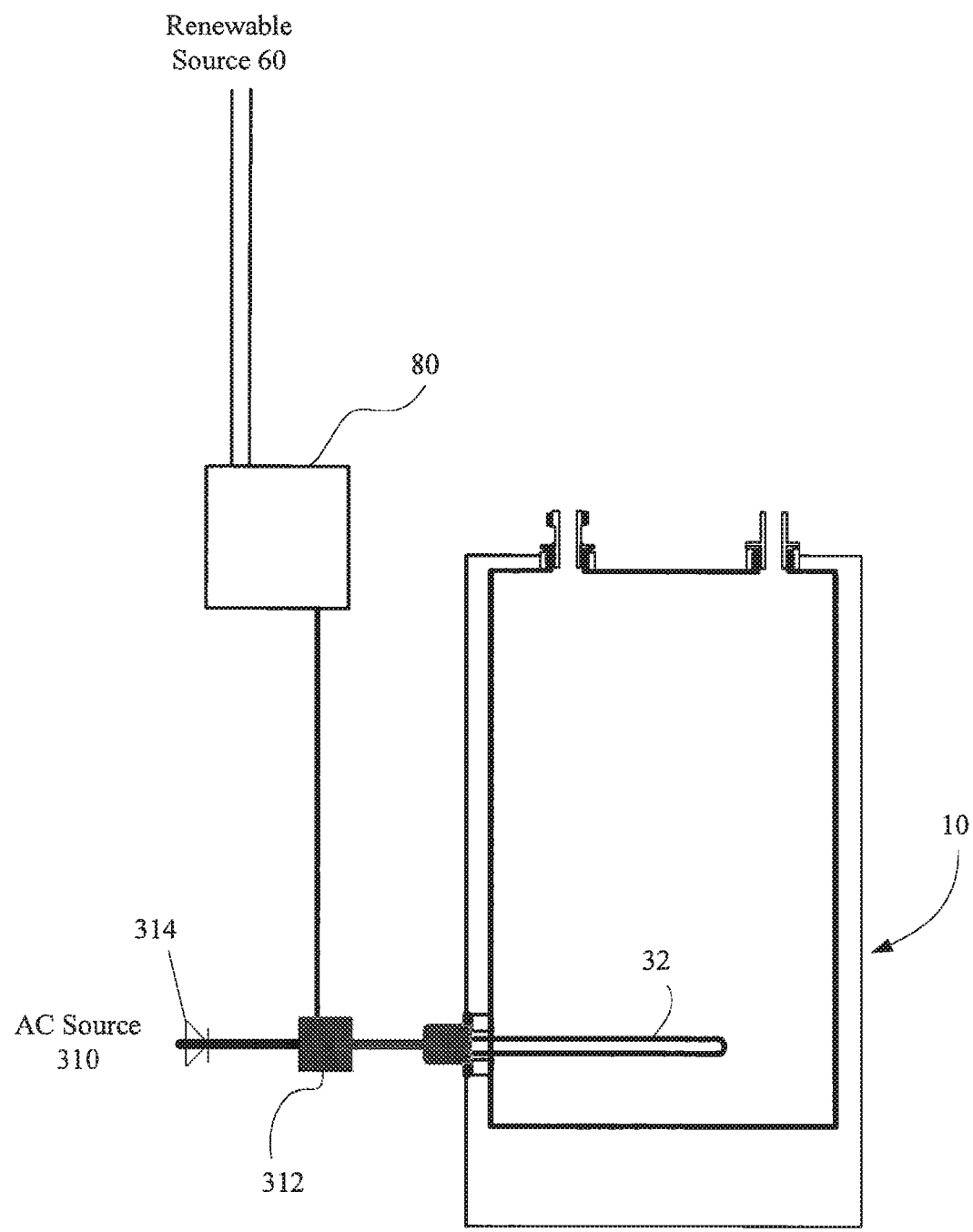
FIG. 13 illustrates a dual connection to a single electrical heating element.

FIG. 13 illustrates a further embodiment of a system that allows interconnection of a water heater to a renewable energy source. In this embodiment, a renewable energy source, for example PV array 60, and an AC source 310 are connected to a common heater element 32. Various arrangements are possible for the dual connection of the renewable energy source 60 and the AC source to 10 to the common heater element 32.

In a first embodiment, a controller 80, which in some arrangements may include an inverter, receives power from a renewable energy source 60 and is electrically interconnected to a junction box 312. The controller 80 provides electrical power from the renewable energy source to the junction box 312. In addition, the controller 80 controls a switch within the junction box 312 to selectively connect and disconnect the power sources. For instance, the switch may disconnect the AC source 310 when sufficient electrical power is received from the renewable energy source 60. In this regard, upon determining that the power from the renewable energy source is above a predetermined minimum, the AC power source 310 is disconnected and electrical energy from the renewable energy source 60 is provided directly to the heater element 32. The electrical energy provided from the renewable energy source 60 may be in the form of a DC current or, if inverter is utilized, in the form of an AC current.

The present inventors have also recognized that electrical heater elements, which are primarily designed for use with an AC current, are also operative upon the application of a DC current. That is, there is little difference in AC element in a DC element so long as the maximum wattage provided by the renewable energy source/PV array 60 is below the maximum wattage for the element. Typically, such AC heating elements have a maximum wattage rating over 500 W and more commonly over 2000 W. Accordingly, the PV array 60 or other renewable energy source may be sized to have a maximum wattage output that is less than the wattage rating of the heating element.

In a second embodiment, AC current may be provided from the renewable energy source to the heater element 32. In this embodiment, an inverter may be combined with the controller or otherwise disposed between the renewable energy source 60 and the junction box 312. In a further arrangement, micro-inverters may be mounted on each of the PV panels of the solar array. Micro-inverters produce utility matching power directly at the back of the panel. Such arrays of panels are connected in parallel to each other and fed to an application and/or to the grid. This has the major advantage that a single failing panel or inverter will not take the entire string of panels offline. In any arrangement utilizing an inverter, AC current may be fed to the heating element 32 to generate heat. Again, such a system may utilize a junction box 312 that disconnects the AC power source 310 prior to application of the AC current from the renewable energy source 60. Alternatively, a block-in diode 314 may be disposed in line between the AC source 310 in the junction box 312 to prevent AC current from the renewable energy source 60 from entering into the grid. In an arrangement incorporating the blocking diode 314, the system may not need anti-islanding protection that, in the event of a power failure on the grid, turn of typical grid-tie inverters for a short period of time. This prevents the inverters from continuing to feed power into small sections of the grid, known as "islands" as powered islands present a risk to workers who may expect the area to be unpowered. That is, the blocking diode 314 maintains separation between the AC current received from the inverter in the AC power from the utility/grid.

In a further embodiment, the system utilizes a grid-tie inverter (e.g., integrated into the controller, panels and/or standalone unit) which matches phase of the renewable energy AC power with the sine wave of the utility-supplied AC power 310. In this arrangement, the power from both sources 60, 310 are matched and may be applied to the heating element 32 separately and/or simultaneously. The system may again utilize a junction box 312 that incorporates a switch for disconnecting the AC power source 310 when sufficient energy is available from the renewable energy source 60. Alternatively, the system may utilize power from both sources 60, 310. In this regard, power from the renewable energy source 60 may supplement power from the AC source 310, which works to reduce the overall power usage from the AC source 310. Furthermore, in this embodiment excess power from the renewable energy source 60 may be fed back into the grid. That is, if the renewable energy source 60 provides more power than is necessary to operate the heating element or if the heating element is deactivated due to the water temperature in the tank achieving a desired temperature, the energy from renewable energy source 60 may be fed directly back into the grid in a net metering arrangement.

All of the embodiments discussed in relation to FIG. 13 allow for interconnecting a renewable energy source 62 a standard electric water heater 10. That is, the water heater requires no modification to work with the system. However, it will be appreciated that the water heater of FIG. 12 may be modified to utilize a specialized heater element. For instance, the heater element 32 may be replaced with a dual element heater assembly as discussed in relation to FIGS. 11A-11C.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. For instance, it will be appreciated that various aspects of the presented invention may be applicable to differently configures hot water heaters. Such differently configured hot water heaters may include a heat pump heating element. In such systems, the heat pump may be selectively operated utilizing renewable power and/or the tanks of these hot water heaters may incorporate supplemental heating elements that are connected to renewable energy sources. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

The invention claimed is:

1. A hot water heating system, comprising:
a storage tank having:
an inlet fluidly connectable to a water supply;
an outlet fluidly connectable to at least at least one valve, wherein when the valve is opened, water from the water supply displaces water through the storage tank and out the outlet;
a first heating element connectable to a power source that provides one of combustible gas and AC electricity;
a thermostat interconnected to the first heating element, wherein the thermostat controls operation of the heating element based at least in part on a temperature of water in the storage tank;
a second heating element, having:
a threaded collar for threaded insertion with a threaded opening of the storage tank,
an electrical heating element connected to the threaded collar, wherein the electrical element is disposed within the storage tank when the threaded collar is threaded into the threaded opening of the storage tank;
an electrical connector electrically connected to the electrical element, wherein the electrical connector is disposed on an outside of the storage tank when the threaded collar is threaded into the threaded opening the storage tank;
a renewable DC power source having electrical leads interconnected to the electrical connector, wherein the renewable DC power source provides electrical power to the second heating element
a controller interconnected to the first heating, element and the second heating element, wherein the controller selectively operates the first and second heating elements, wherein the controller further comprises:
operating logic adapted to identify expected usage times when water passes through the tank between the inlet and the outlet; and
control logic operative to control the first and second heating elements based at least in part on the usage times.

2. The system of claim 1, wherein the renewable DC power source further comprises an inverter, wherein the renewable DC power source provides AC electrical power to the second heating element.

3. The system of claim 1, wherein the renewable DC power source comprises at least one photovoltaic array.

4. The system of claim 1, further comprising:
a temperature sensor interconnected to the second heating element; and
a circuit interrupt disposed between the renewable DC power source and the second heating element, wherein the circuit interrupt opens upon the temperature sensor reaching a predetermined temperature, wherein the circuit interrupt prevents transfer of the electrical power to the electrical element when open.

5. The system of claim 4, wherein the predetermined temperature is selectable by a user.

6. The system of claim 1, wherein the threaded collar is sized for threaded engagement with one of the inlet and the outlet of the storage tank.

7. The system of claim 6, wherein the threaded collar further comprises:
a tubular body having a hollow interior extending between first and second open ends providing a fluid flow passageway through the treaded collar.

8. The system of claim 7, wherein first and second electrical leads extend through a sidewall of the tubular body between the first and second open ends, wherein the electrical leads interconnect the electrical element and the electrical connector.

9. The system of claim 7, wherein:
the tubular body defines a conduit with a first cross-sectional area; and
wherein a combined cross-sectional area of the first and second electrical leads define a second cross-sectional area, wherein the second cross-sectional area is less than 40% of the first cross-sectional area.

10. The system of claim 1, wherein the threaded collar is sized for threaded engagement within one of: a drain opening of the storage tank and a pressure relief valve opening of the storage tank.

11. The system of claim 1, wherein said first heating element is an AC electrical heating element and wherein:
said first AC electrical heating element and said second electrical heating element are both connected to said threaded collar, wherein said first AC electrical heating element and said second electrical heating element are disposed through a common threaded opening of the storage tank.

12. The system of claim 1, wherein the control logic operates the second heating element when a temperature of the tank is below a predetermined threshold level, current is being received from the renewable power source and a next expected usage time is more than a predetermined time period away.

13. The system of claim 1, wherein the first heating element is connected to an AC utility provider, wherein the AC utility provider can remotely disable the first heating element.

14. The system of claim 1, wherein the controller identifies an amount of power received from the renewable power source.

15. The system of claim 14, wherein the controller is in data communication with a utility provider, wherein the controller reports power received from the renewable power source to the utility provider.

16. The system of claim 1, further comprising:
a third heating element, having:
a threaded collar for threaded insertion with a threaded opening of the storage tank,
an electrical element connected to the threaded collar, wherein the electrical element is disposed within the storage tank; and
an electrical connector electrically connected to the electrical element, wherein the electrical connector is disposed on an outside surface of the storage tank and is connectable to the renewable DC power source.

17. The system of claim 1, wherein the DC power source is a photovoltaic array, further comprising;
a maximum power point tracking (MPPT) module for controlling power output of the photovoltaic array.

* * * * *

UNITED STATES PATENT AND TRADEMARK OFFICE
CERTIFICATE OF CORRECTION

PATENT NO. : 9,002,185 B2
APPLICATION NO. : 13/442701
DATED : April 7, 2015
INVENTOR(S) : David Kreutzman It is certified that error appears in the above-identified patent and that said Letters Patent is hereby corrected as shown below:

In the specification

At Column 12, line 4, delete "provide an" and insert therefor --provides a--

At Column 15, line 11, delete "the" and insert therefor --then--

At Column 23, line 14, delete the first instance of "at least"

In the claims

At Column 23, line 42, after the word heating insert --,--

At Column 24, line 8, delete "treaded" and insert therefor --threaded--

Signed and Sealed this
Fifth Day of July, 2016

Michelle K. Lee
*Director of the United States Patent and Trademark Office*